United States Patent
Kimura et al.

(10) Patent No.: US 10,747,432 B2
(45) Date of Patent: Aug. 18, 2020

(54) STORAGE DEVICE, STORAGE SYSTEM, AND STORAGE CONTROL METHOD

(71) Applicant: FUJITSU LIMITED, Kawasaki-shi, Kanagawa (JP)

(72) Inventors: Hiroki Kimura, Numazu (JP); Toshiharu Makida, Numazu (JP)

(73) Assignee: FUJITSU LIMIITED, Kawasaki (JP)

( * ) Notice: Subject to any disclaimer, the term of this patent is extended or adjusted under 35 U.S.C. 154(b) by 0 days.

(21) Appl. No.: 15/659,801

(22) Filed: Jul. 26, 2017

(65) Prior Publication Data

US 2018/0032256 A1 Feb. 1, 2018

(30) Foreign Application Priority Data

Jul. 27, 2016 (JP) ................................. 2016-147628

(51) Int. Cl.
*G06F 3/06* (2006.01)
*G06F 12/02* (2006.01)

(52) U.S. Cl.
CPC .......... *G06F 3/0604* (2013.01); *G06F 3/0614* (2013.01); *G06F 3/0647* (2013.01); *G06F 3/0671* (2013.01); *G06F 3/0683* (2013.01); *G06F 12/0246* (2013.01)

(58) Field of Classification Search
CPC .... G06F 3/0604; G06F 3/0614; G06F 3/0647; G06F 3/0671; G06F 3/0683; G06F 12/0246
USPC .......................................................... 711/103
See application file for complete search history.

(56) References Cited

U.S. PATENT DOCUMENTS

| | | | | |
|---|---|---|---|---|
| 5,724,552 | A | * 3/1998 | Taoda | ..................... G06F 3/061 707/999.202 |
| 5,893,139 | A | * 4/1999 | Kamiyama | ........... G06F 12/122 711/113 |
| 7,539,709 | B1 | * 5/2009 | Vengerov | ................ G06F 16/10 |
| 7,809,884 | B1 | 10/2010 | Linnell | |

(Continued)

FOREIGN PATENT DOCUMENTS

| | | |
|---|---|---|
| JP | 4-107750 | 4/1992 |
| JP | 7-225706 | 8/1995 |

(Continued)

OTHER PUBLICATIONS

Notice of Reasons for Refusal, dated Mar. 10, 2020, in corresponding Japanese Application No. 2016-147628 (9 pp.).

*Primary Examiner* — Yaima Rigol
(74) *Attorney, Agent, or Firm* — Staas & Halsey LLP

(57) ABSTRACT

A storage device includes a first memory having a first access speed, a second memory having a second access speed slower than the first access speed, and a processor coupled to the first memory and the second memory and configured to copy one or a plurality of first data blocks included in a plurality of data blocks stored in the first memory, to the second memory, determine whether a processing amount per unit of time in the first memory reaches a threshold value based on a limit value of the processing amount when the processor receives a read request of a second data block included in the first data blocks, and read the second data block from the first memory when the processing amount does not reach the threshold value, and read the second data block from the second memory when the processing amount reaches the threshold value.

5 Claims, 22 Drawing Sheets

(56) References Cited

U.S. PATENT DOCUMENTS

| | | | | |
|---|---|---|---|---|
| 2004/0003195 | A1* | 1/2004 | Takahashi | G11C 7/1021 711/170 |
| 2008/0082735 | A1* | 4/2008 | Shiga | G06F 13/28 711/103 |
| 2008/0082762 | A1* | 4/2008 | Taeuber | G06F 13/4239 711/154 |
| 2010/0023652 | A1* | 1/2010 | Kono | G06F 3/0604 710/18 |
| 2010/0037009 | A1* | 2/2010 | Yano | G06F 12/0246 711/103 |
| 2010/0115220 | A1* | 5/2010 | Lee | G11C 16/349 711/163 |
| 2011/0106789 | A1* | 5/2011 | Gao | G06F 16/2471 707/713 |
| 2011/0197027 | A1 | 8/2011 | Balasubramanian et al. | |
| 2011/0271071 | A1* | 11/2011 | Nakatogawa | G06F 3/061 711/165 |
| 2012/0054421 | A1* | 3/2012 | Hiratsuka | G06F 12/0246 711/103 |
| 2014/0059294 | A1* | 2/2014 | Naruse | G06F 3/0689 711/114 |
| 2014/0173268 | A1* | 6/2014 | Hashimoto | G06F 3/0653 713/2 |
| 2014/0289449 | A1* | 9/2014 | Ogata | G06F 3/061 711/103 |
| 2015/0227313 | A1* | 8/2015 | Lee | G06F 12/1009 711/103 |
| 2016/0179420 | A1 | 6/2016 | Mei et al. | |
| 2016/0191322 | A1 | 6/2016 | Bita et al. | |

FOREIGN PATENT DOCUMENTS

| | | |
|---|---|---|
| JP | 2009-281970 | 12/2009 |
| JP | 2011-165164 | 8/2011 |
| JP | 2011-242862 | 12/2011 |
| JP | 2012-168840 | 9/2012 |
| JP | 2016-118821 | 6/2016 |
| JP | 2016-119020 | 6/2016 |

* cited by examiner

FIG. 6
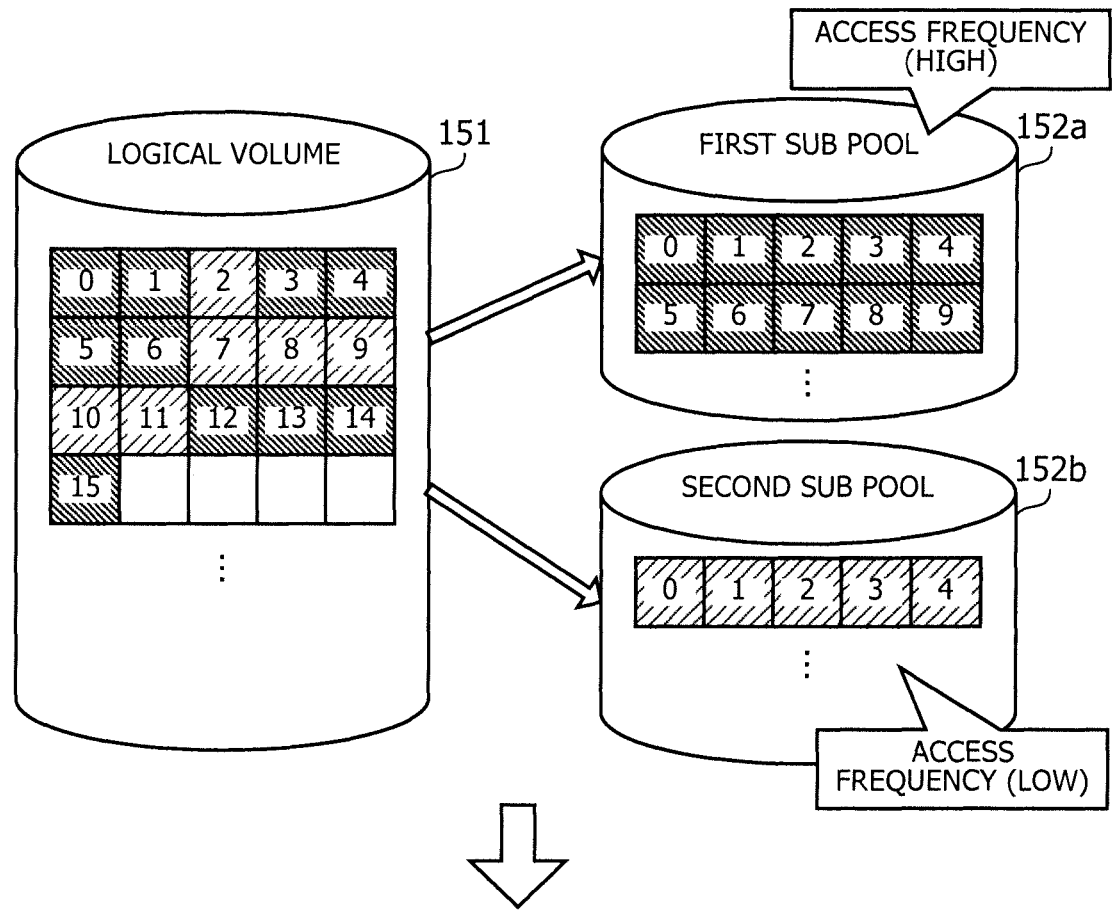
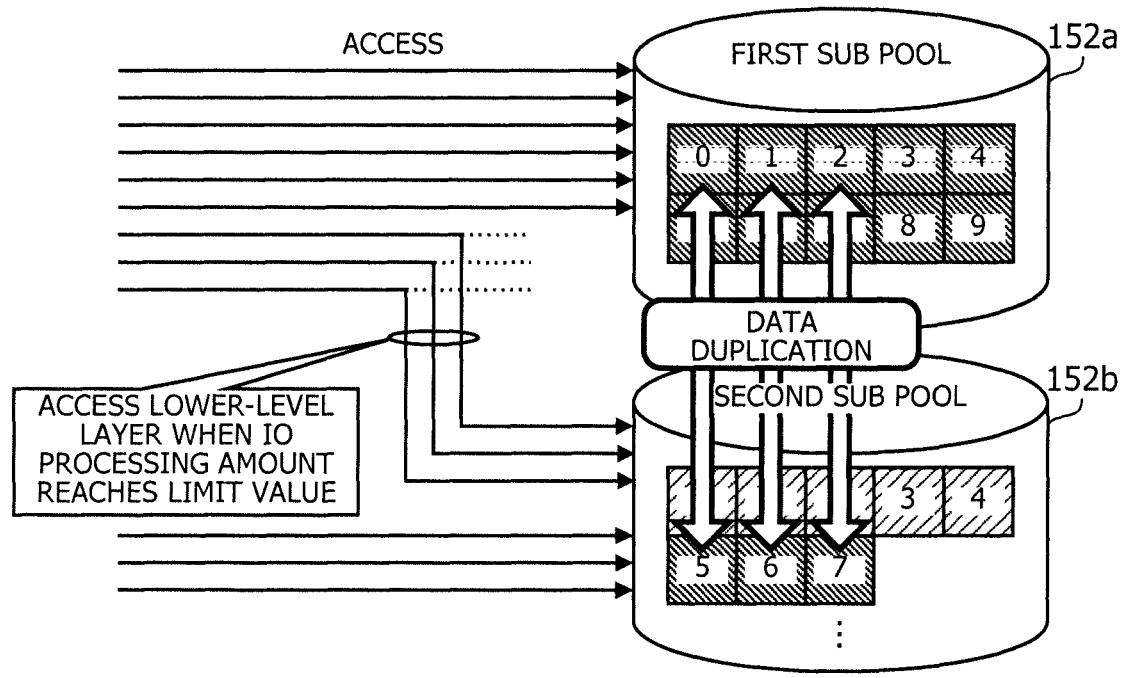

| VOLUME NUMBER | LOGICAL BLOCK NUMBER | PHYSICAL LOCATION |
|---|---|---|
| 0 | 3 | 0 – 2, 1 - 1 |
| ... | ... | ... |

| VOLUME NUMBER | LOGICAL BLOCK NUMBER | NUMBER OF ACCESSES |
|---|---|---|
| 0 | 0 | 100 |
| 0 | 1 | 200 |
| 0 | 2 | 50 |
| 0 | 3 | 1000 |
| ... | ... | ... |

|  | SSD | Online Disk | Nearline Disk |
|---|---|---|---|
| MAXIMUM NUMBER OF READ BLOCKS | 9000 | 8400 | 4000 |
| MAXIMUM NUMBER OF WRITE BLOCKS | 8400 | 8400 | 2400 |
| MAXIMUM NUMBER OF READ COMMANDS | 30 | 34 | 32 |
| MAXIMUM NUMBER OF WRITE COMMANDS | 36 | 34 | 32 |

| SUB POOL NUMBER | PROCESSING AMOUNT FLAG |
|---|---|
| 0 | 0 |
| 1 | 1 |
| 2 | 1 |

| DISK NUMBER | DISK TYPE | SUB POOL NUMBER | VOLUME NUMBER |
|---|---|---|---|
| 0 | SSD | 0 | 0 |
| 1 | SSD | 0 | 0 |
| 2 | Online Disk | 1 | 0 |
| 3 | Online Disk | 1 | 0 |
| 4 | Nearline Disk | 2 | 0 |
| 5 | Nearline Disk | 2 | 0 |
| 6 | SSD | 3 | 1 |
| ... | ... | ... | ... |

| COMMAND | ADRESS | BLOCK SIZE |
|---------|--------|------------|
| READ | 0 | 200 |
| READ | 100 | 50 |
| WRITE | 12 | 400 |
| ... | ... | ... |

|  | | SSD | Online Disk | Nearline Disk |
|---|---|---|---|---|
| SEQUENTIAL ACCESS | READ THROUGHPUT [MB/s] | 500 | 200 | 50 |
| | WRITE THROUGHPUT [MB/s] | 350 | 200 | 30 |
| | READ RESPONSE PERIOD [ms] | 9 | 21 | 40 |
| | WRITE RESPONSE PERIOD [ms] | 12 | 21 | 40 |
| RANDOM ACCESS | READ IOPS | 50000 | 480 | 160 |
| | WRITE IOPS | 12000 | 400 | 150 |
| | READ RESPONSE PERIOD [ms] | 0.6 | 70 | 200 |
| | WRITE RESPONSE PERIOD [ms] | 3 | 85 | 215 |

134

|  | SSD | Online Disk | Nearline Disk |
|---|---|---|---|
| MAXIMUM NUMBER OF READ BLOCKS | 9000 | 8400 | 4000 |
| MAXIMUM NUMBER OF WRITE BLOCKS | 8400 | 8400 | 2400 |
| MAXIMUM NUMBER OF READ COMMANDS | 30 | 34 | 32 |
| MAXIMUM NUMBER OF WRITE COMMANDS | 36 | 34 | 32 |

STORAGE DEVICE, STORAGE SYSTEM, AND STORAGE CONTROL METHOD

CROSS-REFERENCE TO RELATED APPLICATION

This application is based upon and claims the benefit of priority of the prior Japanese Patent Application No. 2016-147628, filed on Jul. 27, 2016, the entire contents of which are incorporated herein by reference.

FIELD

The embodiments discussed herein are related to a storage device, a storage system, and a storage control method.

BACKGROUND

In a memory, an access performance or cost per capacity is different depending on a type or a model even having the same type. Typically, as the access performance becomes higher, the cost per capacity becomes higher. Therefore, the type or the model of a memory is selected in consideration of a balance between the desired access performance and the desired capacity, and the upper limit of the cost.

From such a viewpoint, it is conceived that a plurality of memories having different access performances is utilized effectively. For example, a technology is known in which memories in a storage device are layered in accordance with the access performances, and pieces of data are rearranged between the layers. In such a technology, data having a high access frequency is arranged in a memory having a high performance, and data having a low access frequency is arranged in a memory having a low performance.

In addition, the following technology has been proposed for layering of memories. For example, a storage system has been proposed in which data of a second storage layer is mirrored to a first storage layer, and a read command is caused to be transmitted to the second storage layer when a factor measurement value of quality of service (QoS) is smaller than a specific threshold value.

In addition, the following computing system has also been proposed. In such a computing system, an identical file is created in two memories having different classes, and data is read from the memory in a high class in response to a read request. In addition, when a file is broken at the time of access, the other file is copied to another memory of the same class. Japanese Laid-open Patent Publication No. 2011-165164 and Japanese Laid-open Patent Publication No. 04-107750 are the related arts.

SUMMARY

According to an aspect of the invention, a storage device includes a first memory having a first access speed, a second memory having a second access speed slower than the first access speed, and a processor coupled to the first memory and the second memory and configured to copy one or a plurality of first data blocks included in a plurality of data blocks stored in the first memory, to the second memory, determine whether a processing amount per unit of time in the first memory reaches a threshold value based on a limit value of the processing amount when the processor receives a read request of a second data block included in the first data blocks, and read the second data block from the first memory when the processing amount does not reach the threshold value, and read the second data block from the second memory when the processing amount reaches the threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating a problem of the layer control and the solution;

FIG. 9 is a diagram illustrating a configuration example of a duplication block management table;

FIG. 10 is a diagram illustrating a configuration example of an access status management table;

FIG. 11 is a diagram illustrating a configuration example of a device performance management table;

FIG. 12 is a diagram illustrating a configuration example of a flag management table;

FIG. 13 is a diagram illustrating a configuration example of a configuration management table;

FIG. 14 is a diagram illustrating a configuration example of a command management table;

FIG. 18 is a diagram illustrating an example of a creation method of a device performance management table;

DESCRIPTION OF EMBODIMENTS

There is a problem in which the response speed for an access request is reduced when accesses to a memory provided in a storage device are concentrated, and the number of accesses or a transfer data amount exceeds an allowable range even in a case in which the memory has a high access performance.

An object of an embodiment is to provide a storage controller, a storage system, and a storage control method in which the response performance for an access request may be improved. Embodiments of the technology discussed herein are described below with reference to drawings.

First Embodiment

Figure 1:
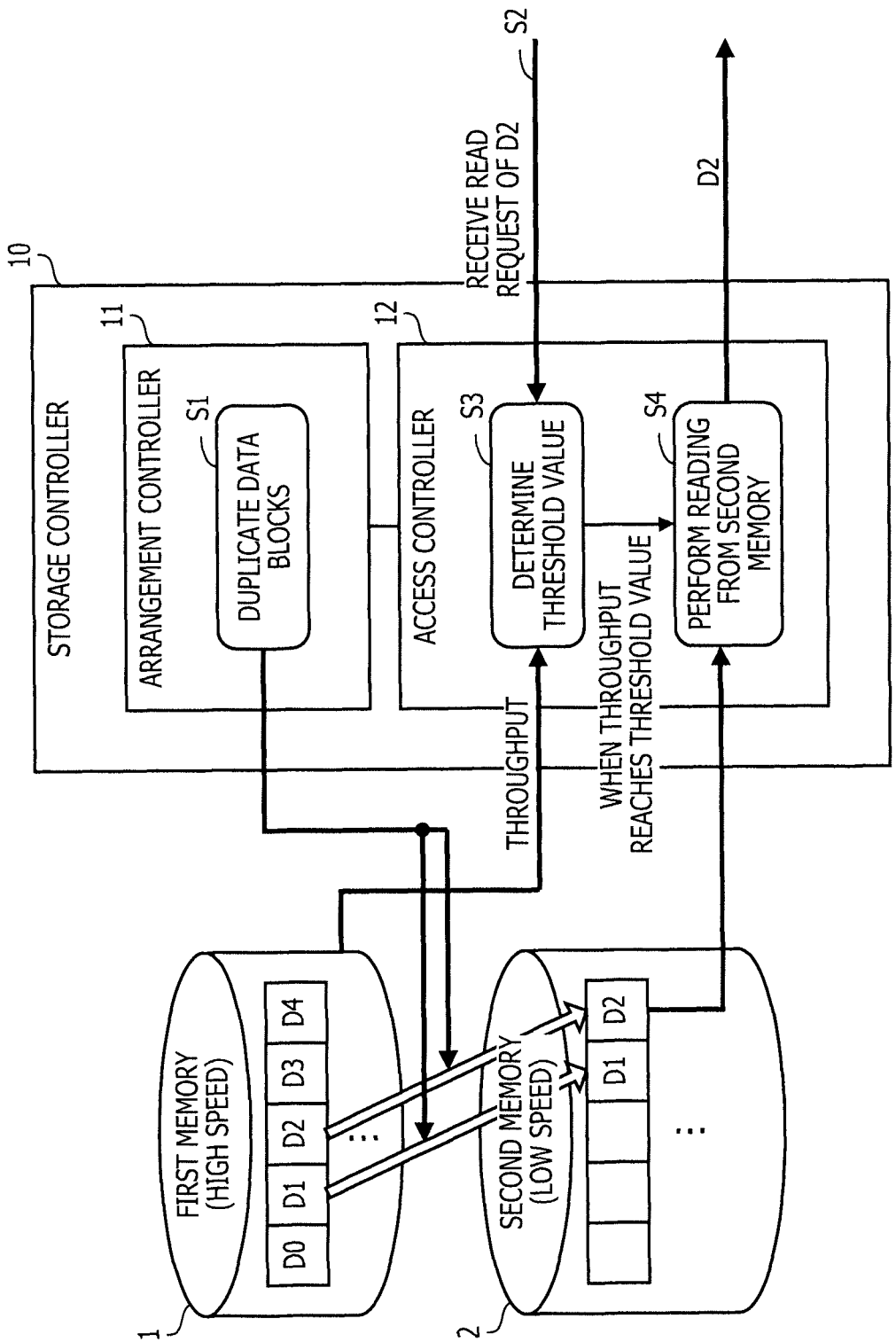
FIG. 1 is a diagram illustrating a configuration example and a processing example of a storage controller according to a first embodiment.

FIG. 1 is a diagram illustrating a configuration example and a processing example of a storage controller according to a first embodiment. A first memory 1 and a second memory 2 are coupled to a storage controller 10 illustrated in FIG. 1. The access speed of the second memory 2 is lower than the access speed of the first memory 1.

The storage controller 10 includes an arrangement controller 11 and an access controller 12. Pieces of processing of the arrangement controller 11 and processing of the access controller 12 may be realized, for example, when a processor included in the storage controller 10 executes a specific program.

The arrangement controller 11 duplicates 1 or a plurality of first data blocks from among a plurality of data blocks stored in the first memory 1 to the second memory 2 (Step S1). In the example of FIG. 1, from among data blocks D0 to D4 stored in the first memory 1, the data blocks D1 and D2 are also stored in the second memory 2.

The access controller 12 receives a read request of a second data block, from among the above-described 1 or plurality of first data blocks stored in the first memory. After that, the access controller 12 determines whether a processing amount within unit of time in the first memory 1 reaches a threshold value based on a limit value of the processing amount. In the example of FIG. 1, the access controller 12 receives a read request of the data block D2 (Step S2), and determines whether the processing amount within the unit of time in the first memory 1 reaches the above-described threshold value, in response to the read request (Step S3). The limit value of the processing amount is a value determined based on the performance of the first memory 1.

Here, although not illustrated, when the processing amount does not reach the threshold value, the access controller 12 reads the data block D2 from the first memory 1. As a result, the reading of the data block D2 may be completed in a short period after the read request. However, when the processing amount reaches the threshold value, the access controller 12 reads the data block D2 not from the first memory 1 but the second memory 2 (Step S4).

When the processing amount in the unit of time in the first memory 1 reaches the threshold value, and the data block D2 is read from the first memory 1, it is highly probable that the primary response performance of the first memory 1 is not exhibited, and the response speed is reduced. In contrast, as described above, when the processing amount in the unit of time in the first memory 1 reaches the threshold value, and the identical data block D2 is read from the second memory 2, accesses are distributed between the memories, and the load of the first memory 1 may not be increased. Thus, as a whole, a probability becomes high in which the reduction width of the read performance of the data block stored in the first memory 1 is suppressed, and the response performance for the read request may be improved.

Second Embodiment

Figure 2:
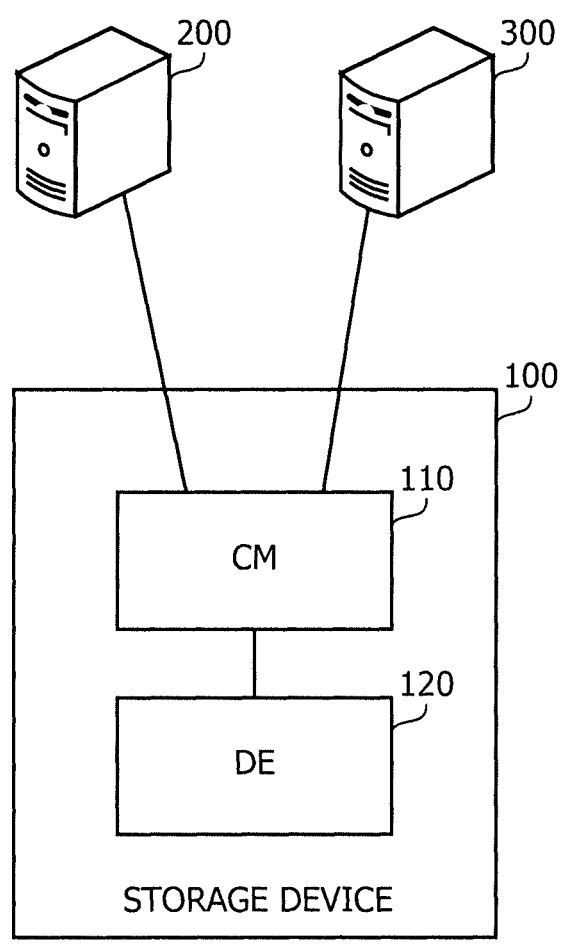
FIG. 2 is a diagram illustrating a configuration example of a storage system according to a second embodiment.

FIG. 2 is a diagram illustrating a configuration example of a storage system according to a second embodiment. The storage system illustrated in FIG. 2 includes a storage device 100, an operation server 200, and a management server 300. In addition, the storage device 100 includes a controller module (CM) 110 and a drive enclosure (DE) 120. The storage device 100 may include two or more CMs and may include two or more DEs.

The DE 120 includes a plurality of memories each of which stores data that is an access target from the operation server 200. As described later, in the DE 120, memories having different access performances are provided.

The CM 110 is a storage controller that accesses a memory in the DE 120 in response to an access request from the operation server 200. In addition, the operation of the CM 110 is managed by the management server 300. For example, the CM 110 rearranges data of a logical volume from a memory in the DE 120 to another memory, in response to an instruction from the management server 300. The CM 110 is an example of the storage controller 10 illustrated in FIG. 1.

The operation server 200 is coupled to the CM 110, for example, through a storage area network (SAN). The operation server 200 is a server computer that executes pieces of processing related to various operations. The operation server 200 accesses a logical volume provided by the CM 110, due to processing related to an operation.

The management server 300 is coupled to the CM 110, for example, through a local area network (LAN). The management server 300 is a server computer that manages the operation of the storage device 100. For example, the management server 300 performs layer control in the storage device 100. The layer control is processing in which data stored in the storage device 100 is controlled so as to be arranged in a memory area corresponding to the access frequency to the data from among a plurality of memory areas respectively realized by memories having different access performances.

Figure 3:
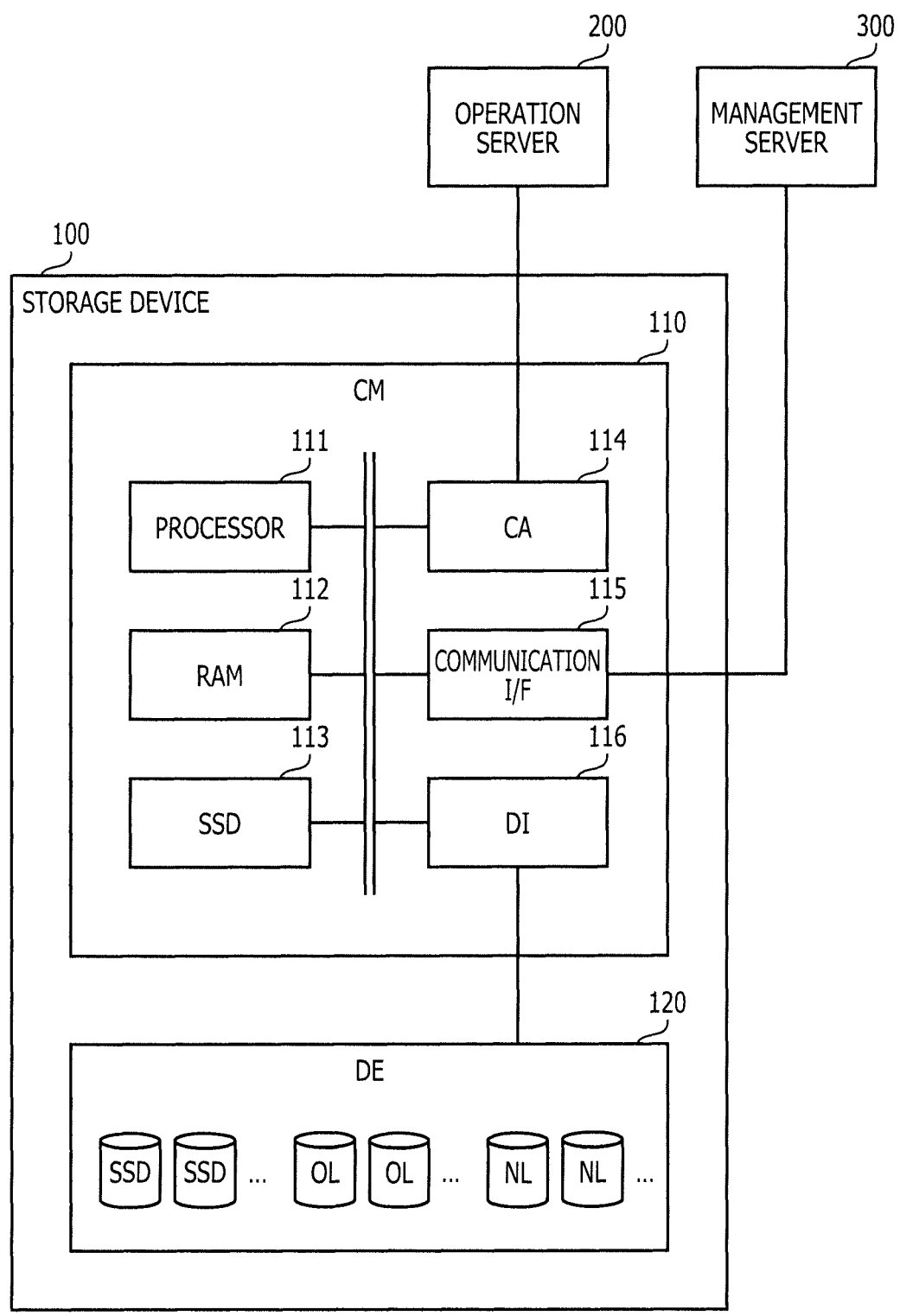
FIG. 3 is a diagram illustrating a hardware configuration example of a storage device.

FIG. 3 is a diagram illustrating a hardware configuration example of the storage device.

The CM 110 includes a processor 111, random access memory (RAM) 112, a solid state drive (SSD) 113, a channel adapter (CA) 114, a communication interface (I/F) 115, and a drive interface (DI) 116.

The processor 111 controls processing of the CM 110 comprehensively. The processor 111 is, for example, a central processing unit (CPU), a digital signal processor (DSP), an application specific integrated circuit (ASIC), or a field programmable gate array (FPGA). In addition, the processor 111 may be a combination of two or more elements of a CPU, a DSP, an ASIC, an FPGA, and the like.

The RAM 112 is used as a main memory of the CM 110. In the RAM 112, at least some of an application program and a program of an operating system (OS) that the processor 111 is caused to execute is temporarily stored. In addition, in the RAM 112, various pieces of data used for processing by the processor 111 are temporarily stored.

The SSD 113 is used as an auxiliary memory of the CM 110. In the SSD 113, the program of the OS, the application program, and the various pieces of data are stored. The CM 110 may include a hard disk drive (HDD) as the auxiliary memory instead of the SSD 113.

The CA 114 is an interface circuit used for communication with the operation server 200. The communication I/F 115 is an interface circuit used for communication with the management server 300. The DI 116 is an interface circuit used for communication with the memories in the DE 120.

In the DE 120, the plurality of memories having different access performances is provided. In the embodiment, in the DE 120, three types of memories such as a plurality of SSDs, a plurality of HDDs called online disks, and a plurality of HDDs called nearline disks are provided. The access performance is high in order from the SSD, the online disk, and the nearline disk.

Figure 4:
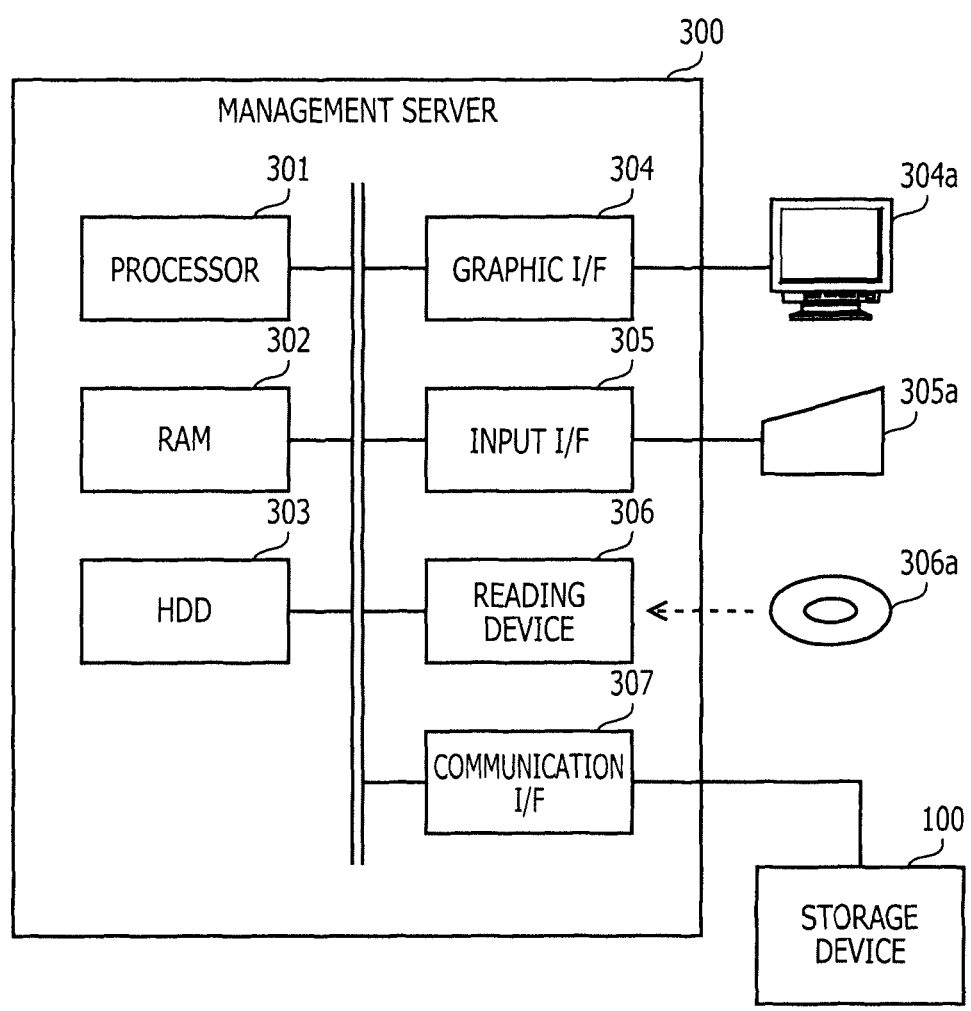
FIG. 4 is a diagram illustrating a hardware configuration example of a management server.

FIG. 4 is a diagram illustrating a hardware configuration example of the management server. The management server 300 includes a processor 301, a RAM 302, an HDD 303, a graphic I/F 304, an input I/F 305, a reading device 306, and a communication I/F 307.

The processor 301 controls processing of the management server 300 comprehensively. The processor 301 is, for example, a CPU, a DSP, an ASIC, or a FPGA. In addition, the processor 301 may be a combination of two or more elements of a CPU, a DSP, an ASIC, a FPGA, and the like.

The RAM 302 is used as a main memory of the management server 300. In the RAM 302, at least some of an application program and a program of an OS that the processor 301 is caused to execute is temporarily stored. In addition, in the RAM 302, various pieces of data used for processing by the processor 301 are temporarily stored.

The HDD 303 is used as an auxiliary memory of the management server 300. In the HDD 303, the program of the OS, the application program, and the various pieces of data are stored. The management server 300 may stores an SSD as the auxiliary memory instead of the HDD 303.

A display device 304a is coupled to the graphic I/F 304. The graphic I/F 304 causes an image to be displayed on a screen of the display device 304a in response to an instruction from the processor 301. Examples of the display device 304a include a liquid-crystal display and an organic electro luminescence (EL) display.

An input device 305a is coupled to the input I/F 305. The input I/F 305 transmits a signal output from the input device 305a, to the processor 301. Examples of the input device 305a include a keyboard and a pointing device. Examples of the pointing device include a mouse, a touch panel, a tablet, a touch pad, and a trackball.

A portable recording medium 306a is attached to or removed from the reading device 306. The reading device 306 reads data recorded in the portable recording medium 306a and transmits the read data to the processor 301. Examples of the portable recording mediums 306a include an optical disk, a magneto-optical (MO) disk, and a semiconductor memory.

The communication I/F 307 transmits and receives data to and from the CM 110 of the storage device 100.

The operation server 200 may also be realized by hardware similar to that of the management server 300.

Figure 5:
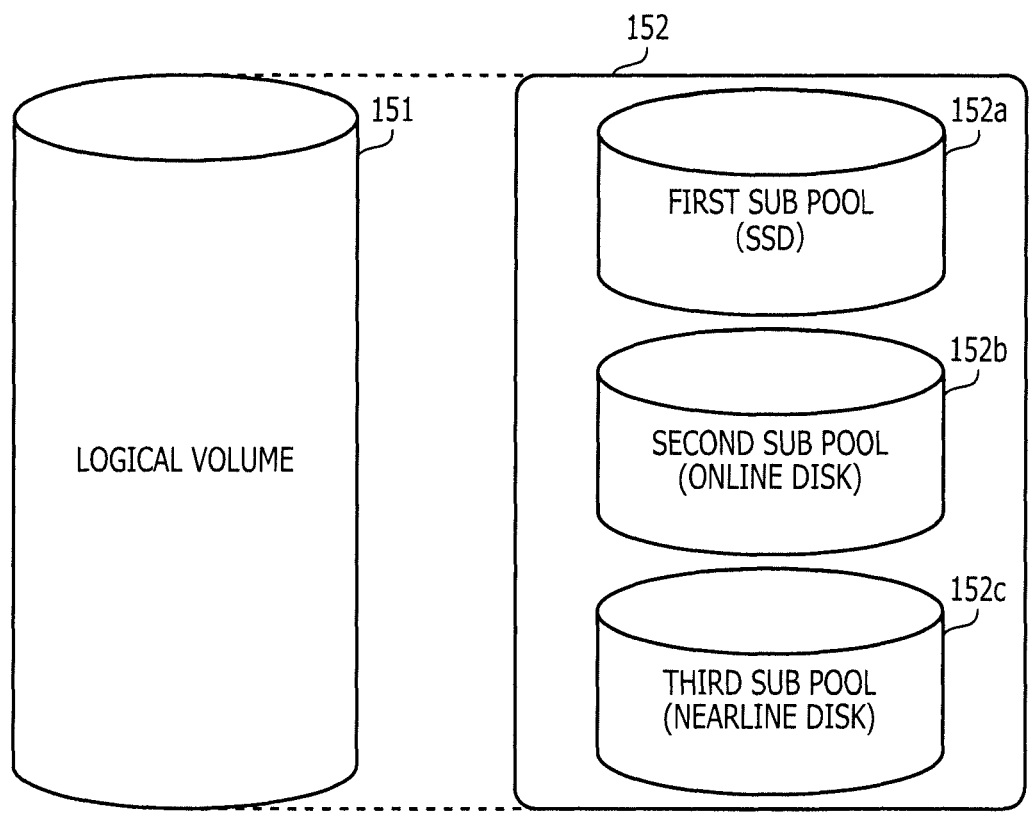
FIG. 5 is a diagram illustrating layer control of a memory.

FIG. 5 is a diagram illustrating layer control of a memory. The CM 110 generates a logical volume 151 that is an access target from the operation server 200. In addition, a storage pool 152 is set to the CM 110. The storage pool 152 is a memory area allocated to the logical volume 151 as a physical area, and is realized by a memory of the DE 120.

A physical area of a single storage pool may be allocated to a plurality of logical volumes. However, in the following description, it is assumed that the physical area of the single storage pool 152 is allocated to the single logical volume 151.

The storage pool 152 is divided into a first sub pool 152a, a second sub pool 152b, and a third sub pool 152c. The first sub pool 152a is realized by one or more SSDs. The second sub pool 152b is realized by one or more online disks. The third sub pool 152c is realized by one or more nearline disks. For example, a single sub pool is defined as one or more groups of redundant arrays of inexpensive disks (RAID), each of which is constituted by memories each having the same access performance.

In such a configuration, the access performance is high in order from the first sub pool 152a, the second sub pool 152b, and the third sub pool 152c. That is, in the storage pool 152, three memory areas having different access performances are layered. In the following description, a sub pool having a relatively-high access performance may be referred to as "upper-level layer sub pool", and a sub pool having a relatively-low access performance may be referred to as "lower-level layer sub pool".

An area of the logical volume 151 is managed so as to be divided into logical blocks each having a specific size. Each of the logical blocks is identified by a logical address. In addition, each of the areas of the first sub pool 152a, the second sub pool 152b, and the third sub pool 152c is managed so as to be divided into blocks each having the same size as the logical block. Hereinafter, blocks of each of the sub pools are referred to as "physical blocks". Each of the physical blocks is identified by a physical address for each of the sub pools.

A physical block of any of the first sub pool 152a, the second sub pool 152b, and the third sub pool 152c is allocated to each of the logical blocks. The management server 300 performs control so that a sub pool having a high access performance is allocated to a logical block of the logical volume 151 having a high access frequency from the operation server 200. For example, when an access frequency of a specific logical block has been reduced, the management server 300 changes an allocation destination of a physical block to the specific logical block, to a sub pool having a lower access performance. In this case, the CM 110 moves data corresponding to the logical block from a physical block on the sub pool before the allocation is changed, to a physical block on the sub pool after the allocation has been changed, in response to an instruction from the management server 300.

Due to such layer control, data having a higher access frequency from the operation server 200 is arranged in an upper-level layer sub pool, so that the response speed for an access request from the operation server 200 becomes higher. As a result, as a whole, the response performance for the access request from the operation server 200 is improved. However, in the layer control, a problem occurs in which accesses to a sub pool having a higher access performance are concentrated, so that the response speed is reduced.

FIG. 6 is a diagram illustrating a problem of the layer control and the solution. In FIG. 6, as an example, layer control between the first sub pool 152a and the second sub pool 152b is illustrated.

As illustrated in the upper part of FIG. 6, physical blocks of the first sub pool 152a are allocated to some of logical blocks of the logical volume 151, and physical blocks of the second sub pool 152b are allocated to other logical blocks of the logical volume 151. In the first sub pool 152a, data having a high access frequency from the operation server 200 as compared with the second sub pool 152b is stored. In addition, when the access frequency to the logical block to which the physical block of the second sub pool 152b has been allocated become high, the allocation destination is changed to the first sub pool 152a, and the data corresponding to the logical block is moved to the first sub pool 152a.

As described above, in an upper-level layer sub pool, pieces of data each having a high access frequency from the operation server 200 are mainly stored, so that accesses to such a sub pool tend to be concentrated. Therefore, when imbalance of access frequencies between pieces of data in the logical volume 151 has become large, accesses to the upper-level layer sub pool may be excessively concentrated. In addition, when the number of accesses or a transfer data amount for the upper-level layer sub pool exceeds an allowable capacity, a problem occurs in which the response speed for an access request is reduced, so that a merit of the layer control is reduced.

Such a problem prominently occurs, for example, in a system in which accesses to specific data tend to be concentrated. Particularly, such a problem easily occurs in a system in which read accesses are prevalent. An example of such a system may include a system in which distribution service of a content such as a movie is provided. For example, accesses to a popular content from among distributed contents are easily concentrated. In addition, there is a case in which merely accesses to a specific content are concentrated in an unexpected fashion due to expansion of information through social networking service (SNS) and the like.

However, aside from the above-described problem, there is a case in which, in a lower-level layer sub pool, the number of accesses or a transfer data amount is small, and there is a spare capacity even while the accesses to the upper-level layer sub pool are concentrated.

Therefore, as illustrated in the lower part of FIG. 6, the CM 110 according to the embodiment duplicates at least some of pieces of data stored in the upper-level layer sub pool so as to also store at least some of the pieces of data in the lower-level layer sub pool. In addition, when reading of the data stored in the upper-level layer sub pool has been requested, the CM 110 determines whether the current input/output (IO) processing amount in the upper-level layer sub pool reaches a limit value based on the performance specific to each of the memories that constitute the sub pool. When the CM 110 determines that the current IO processing amount does not reach the limit value, the CM 110 typically reads the data from the upper-level layer sub pool, but when the CM 110 determines that the current IO processing amount reaches the limit value, the CM 110 reads the data from the lower-level layer sub pool instead of the upper-level layer sub pool.

As a result, when access requests for data in the upper-level layer sub pool are concentrated, some of the accesses may be redirected to the lower-level layer sub pool using the spare portion of the capacity in the lower-level layer sub pool. As a result, as a whole, the processing efficiency for access requests is improved, and the reduction width of the response speed, which is caused by concentration of accesses, may be reduced.

In the above description, the CM 110 determines whether the current IO processing amount reaches the limit value, but the CM 110 may determine whether the current IO processing amount is approaching the limit value by considering a measurement error of the current IO processing amount.

Figure 7:
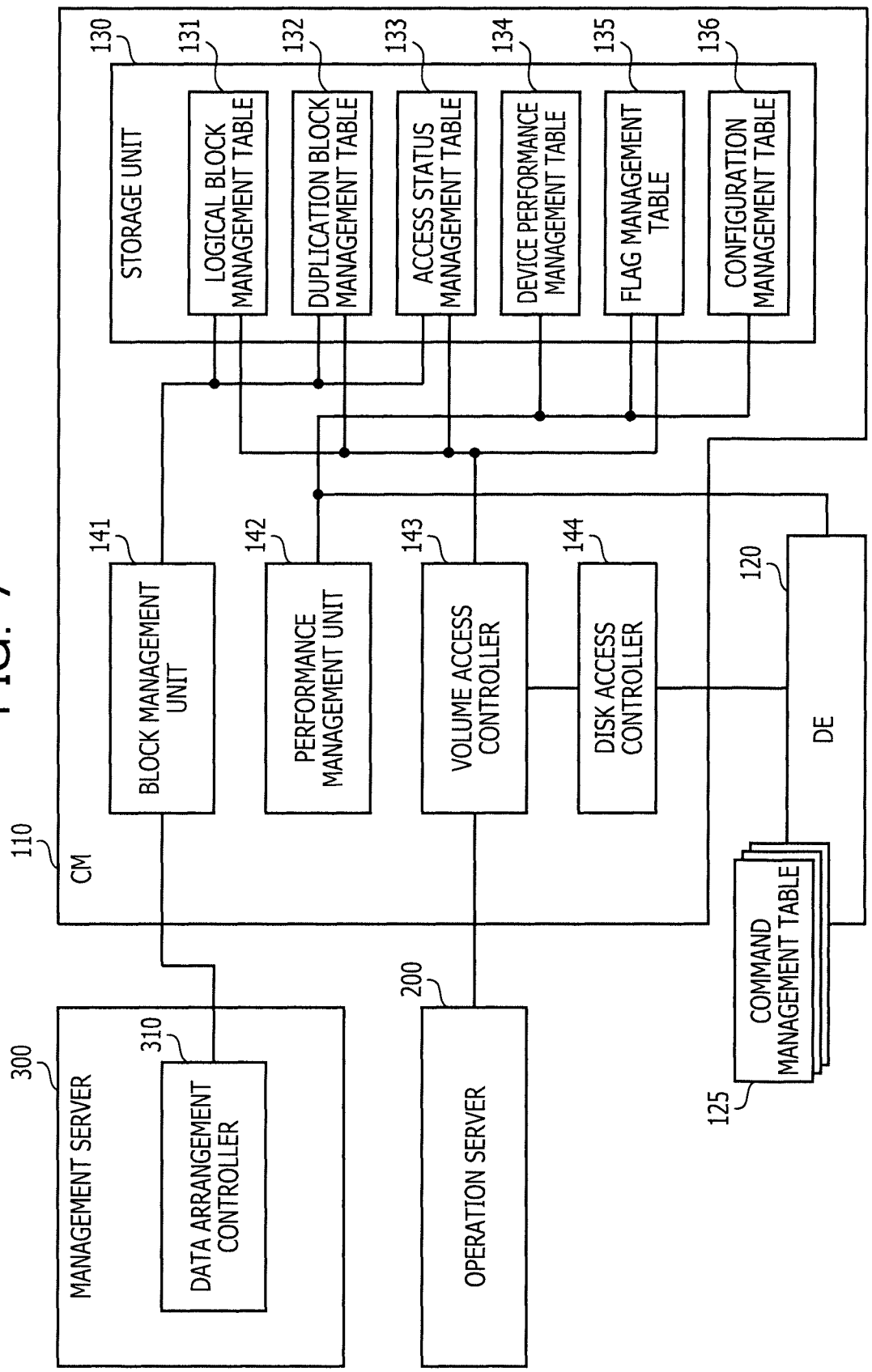
FIG. 7 is a block diagram illustrating a configuration example of a processing function included in the storage system.

FIG. 7 is a block diagram illustrating a configuration example of a processing function included in the storage system.

The CM 110 includes a storage unit 130, a block management unit 141, a performance management unit 142, a volume access controller 143, and a disk access controller 144. The storage unit 130 is realized, for example, by a memory area of a memory included in the CM 110 such as the RAM 112 or the SSD 113. Pieces of processing of the block management unit 141, the performance management unit 142, the volume access controller 143, and the disk access controller 144 are realized, for example, when the processor 111 executes a specific program. The block management unit 141 is an example of the arrangement controller 11 illustrated in FIG. 1, and each of the performance management unit 142 and the volume access controller 143 is an example of the access controller 12 illustrated in FIG. 1.

The management server 300 includes a data arrangement controller 310. Processing of the data arrangement controller 310 is realized, for example, when the processor 301 executes a specific program.

The storage unit 130 of the CM 110 stores a logical block management table 131, a duplication block management table 132, an access status management table 133, a device performance management table 134, a flag management table 135, and a configuration management table 136. Here, a configuration of each of the tables is described.

Figure 8:
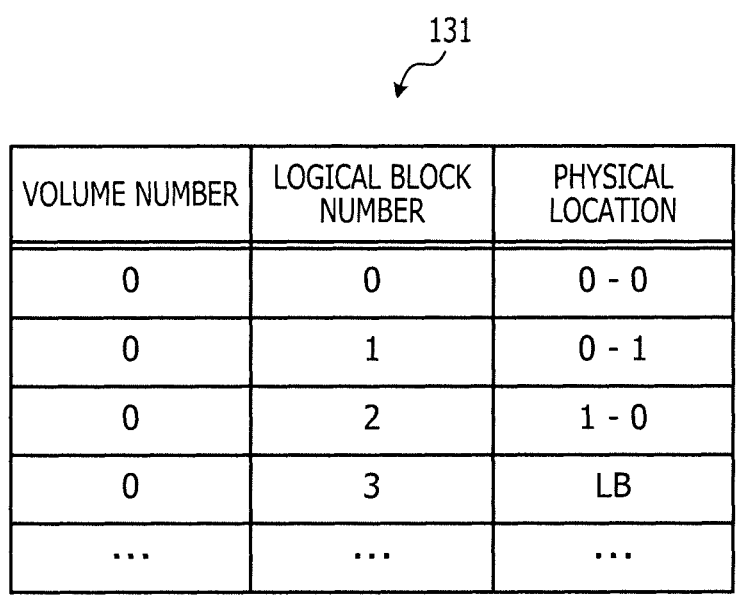
FIG. 8 is a diagram illustrating a configuration example of a logical block management table.

FIG. 8 is a diagram illustrating a configuration example of the logical block management table. The logical block management table 131 is table information used to manage a correspondence relationship between each logical block of a logical volume and a physical block of a sub pool, which is allocated to the logical block. The logical block management table 131 includes items of a volume number, a logical block number, and a physical location.

In the item of the volume number, an identification number of a logical volume that is an access target from the operation server 200 is registered. In the item of the logical block number, an identification number (address) of a logical block on the logical volume is registered. In the item of the physical location, a data format of "X-Y" is registered. Here, "X" indicates an identification number of a sub pool allocated to the logical block, and "Y" indicates an identification number (address) of a physical block on the sub pool. For example, "0-0" indicates a physical block "0" of a sub pool "0". In addition, when data corresponding to the logical block is duplicated to two sub pools, "LB" is registered in the item of the physical location.

For example, when the CM 110 has newly created a logical volume, the CM 110 adds records corresponding to all logical blocks of the logical volume to the logical block management table 131. In this case, physical blocks are not allocated to the new logical volume in the initial state, so that, for example, "NULL" is registered in the item of the physical location of each of the added records. In addition, when data writing to a logical block of the new logical volume has been requested for the first time, the CM 110 allocates a physical bock to the logical block and registers information on the allocated physical block in the item of the physical location.

FIG. 9 is a diagram illustrating a configuration example of the duplication block management table. The duplication block management table 132 is table information used to manage a storage location of data corresponding to a duplication block. Here, "duplication block" is a logical block in which the corresponding data is duplicated to two sub pools from among the logical blocks of the logical volume. In the duplication block management table 132, an item of a physical location is associated with items of a volume number and a logical block number similar to those of the logical block management table 131.

In the item of the physical location, two pieces of data each having a format of "X-Y" indicating the position of a physical block are registered. Similar to the case of the physical block of the logical block management table 131, "X" indicates an identification number of a sub pool allocated to the logical block, and "Y" indicates an identification number (address) of a physical block on the sub pool.

In the duplication block management table 132, merely a record related to a duplication block from among logical blocks of each created logical volume is registered.

FIG. 10 is a diagram illustrating a configuration example of the access status management table. The access status management table 133 is table information used to manage an access frequency to each of the logical blocks of the logical volume from the operation server 200. In the access status management table 133, an item of the number of accesses is associated with items of a volume number and a logical block number similar to those of the logical block management table 131.

In the item of the number of accesses, the number of accesses to a corresponding logical block from the operation server 200 in a specific time period is registered. In the embodiment, it is assumed that, the number of times of data reading is registered in the item of the number of accesses. In the actual processing, count-up for a numerical value registered in the item of the number of accesses is performed by the volume access controller 143 each time data is read from the corresponding logical block. In addition, the numerical value registered in the item of the number of accesses is cleared to "0" at specific time intervals by the block management unit 141.

In the access status management table 133, the number of times of data writing may be registered as the number of accesses instead of the number of times of data reading.

FIG. 11 is a diagram illustrating a configuration example of the device performance management table. The device performance management table 134 is table information used to manage the performance (maximum performance) for each of the memories that constitute the sub pool. In the device performance management table 134, the maximum number of read blocks, the maximum number of write blocks, the maximum number of read commands, and the maximum number of write commands are registered for each of the SSD, the online disk, and the nearline disk.

The maximum number of read blocks indicates the maximum number of blocks allowed to be read per read response period specific to each of the memories. The maximum number of write blocks indicates the maximum number of blocks allowed to be written per write response period specific to each of the memories. The maximum number of read commands indicates the maximum number of read commands allowed to be processed per read response period. The maximum number of write commands indicates the maximum number of write commands allowed to be processed per write response period.

Information registered in the device performance management table 134 may be information applied in advance as specification information of each of the memories, or may be calculated based on a measurement value or the specification information of each of the memories. In addition, the information in the device performance management table 134 is used as a reference value for determining whether the current processing amount in each of the sub pools reaches the limit value. Each of the maximum number of read blocks and the maximum number of write blocks is used as a reference value related to sequential access. In addition, each of the maximum number of read commands and the maximum number of write commands is used as a reference value related to random access.

FIG. 12 is a diagram illustrating a configuration example of the flag management table. The flag management table 135 is table information used to manage an index related to the current processing amount in each of the sub pools. The flag management table 135 includes items of a sub pool number and a processing amount flag.

In the item of the sub pool number, an identification number of a sub pool is registered. The processing amount flag is flag information indicating whether the current processing amount in the sub pool reaches the limit value. The processing amount flag is set at "0" when the current processing amount does not reach the limit value, and is set at "1" when the current processing amount reaches the limit value.

FIG. 13 is a diagram illustrating a configuration example of the configuration management table. The configuration management table 136 includes items of a disk number, a disk type, a sub pool number, and a volume number. In the item of the disk number, an identification number of a memory provided in the DE 120 is registered. In the item of the disk type, the type of the memory is registered. In the embodiment, examples of the disk type include an SSD, an online disk, and a nearline disk. In the item of the sub pool number, an identification number of a sub pool is registered. In the item of the volume number, an identification number of a logical volume is registered.

In the configuration management table 136, a sub pool that is an allocation target to a logical volume and an identification number and the type of each of the memories that constitute the sub pool are managed. For example, in FIG. 13, a sub pool having a sub pool number "0" is constituted by SSDs having disk numbers "0" and "1". In addition, physical blocks of one of sub pools having sub pool numbers "0", "1", and "2" are allocated to a logical volume having a volume number "0".

Information that is stored in the DE 120 and is referred to by the CM 110 is described below. In each of the memories provided in the DE 120, a command management table 125 is stored. The command management table 125 is stored, for example, in an RAM coupled to a controller used to access a recording medium in the memory.

FIG. 14 is a diagram illustrating a configuration example of the command management table. The command management table 125 includes items of a command, an address, and a block size.

The command management table 125 includes a record for each command being executed in the corresponding memory. In the item of the command, information indicating whether the command being executed is a read command or a write command is registered. In the item of the address, an address of the leading block added to the command is registered, and in the item of the block size, a block size added to the command is registered. The address of the leading block indicates the leading position of a write destination area or a read source area, and the block size indicates a read data size or a write data size from the leading position.

Each of the memories includes a function to send information registered in the command management table 125, in response to an information obtaining command from the CM 110. The sent information is used to estimate the current processing amount in each of the sub pools.

Pieces of processing of the block management unit 141 of the CM 110 and the data arrangement controller 310 of the management server 300 are described below.

The block management unit 141 transmits contents of the logical block management table 131, the duplication block management table 132, and the access status management table 133 to the management server 300 at information transmission timing having a specific cycle. The data arrangement controller 310 of the management server 300 identifies a physical block the data of which is to be moved or copied between sub pools, based on the information transmitted from the block management unit 141.

The block management unit 141 receives an instruction of data movement or data copy of the identified physical block from the data arrangement controller 310, and executes processing based on the instruction. In addition, the block management unit 141 receives the logical block management table 131 and the duplication block management table 132 in each of which the content has been updated due to the data movement or the data copy, and updates the corresponding information in the storage unit 130 using the received information.

Figure 15:
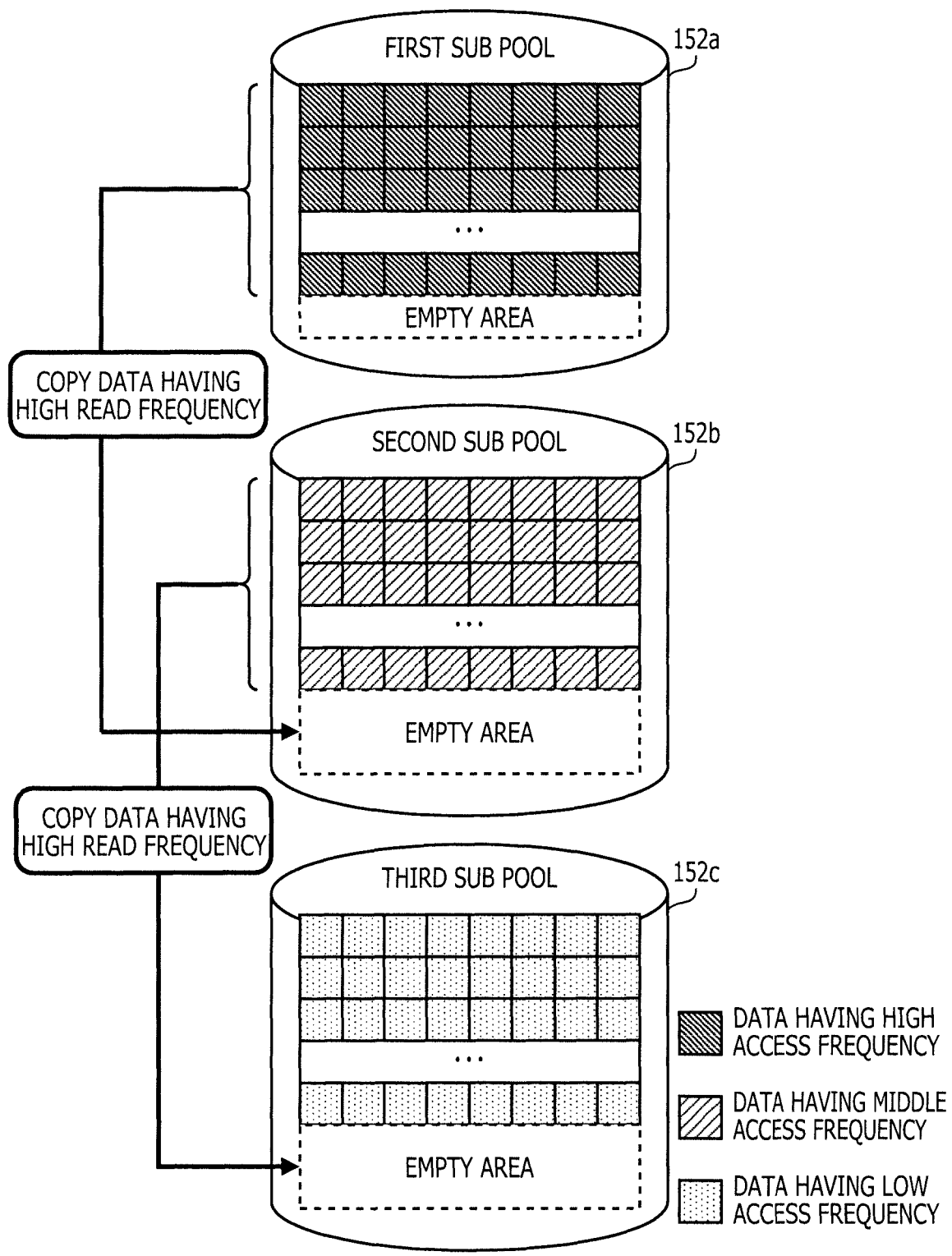
FIG. 15 is a diagram illustrating a data duplication method.

FIG. 15 is a diagram illustrating a data duplication method. A physical block in the storage pool 152 in which data of each logical block in the logical volume 151 is to be arranged is determined by the data arrangement controller 310 of the management server 300.

First, the data arrangement controller 310 arranges pieces of data of logical blocks each having a high access frequency in the first sub pool 152a. In addition, the data arrangement controller 310 arranges pieces of data of logical blocks each having a middle access frequency in the second sub pool 152b. In addition, the data arrangement controller 310 arranges pieces of data of logical blocks each having a low access frequency in the third sub pool 152c. In the embodiment, as an example, pieces of data are allocated to the sub pools at a specific ratio.

An access frequency is periodically measured, and data is moved between the sub pools as appropriate based on the measured access frequency. The measured access frequency may be a read frequency or may be an access frequency of both data reading and data writing.

The data arrangement controller 310 determines arrangement destinations of pieces of data of the logical blocks as described above, and then determines at least some of the pieces of data in the first sub pool 152a and at least some of pieces of data in the second sub pool 152b to be duplicated. The data arrangement controller 310 determines pieces of data each having a high read frequency from among the pieces of data in the logical blocks arranged in the upper-level layer sub pool to be copied to an empty area of a one layer lower sub pool. That is, from among the pieces of data of the logical blocks arranged in the first sub pool 152a, pieces of data each having a high read frequency are copied to an empty area of the second sub pool 152b. In addition, from among the pieces of data of the logical blocks arranged in the second sub pool 152b, pieces of data each having a high read frequency is copied to an empty area of the third sub pool 152c.

An object of the data duplication is to distribute read accesses, so that data that is a duplication target may be determined based on the read frequency of the logical block.

As described above, from among the logical blocks of the upper-level layer sub pool, a logical block having a high read frequency is selected as a duplication block. As a result, when read requests to data in the upper-level layer sub pool are concentrated, a probability may be increased in which the read destination is changed to the lower-level layer sub pool.

Figure 16:
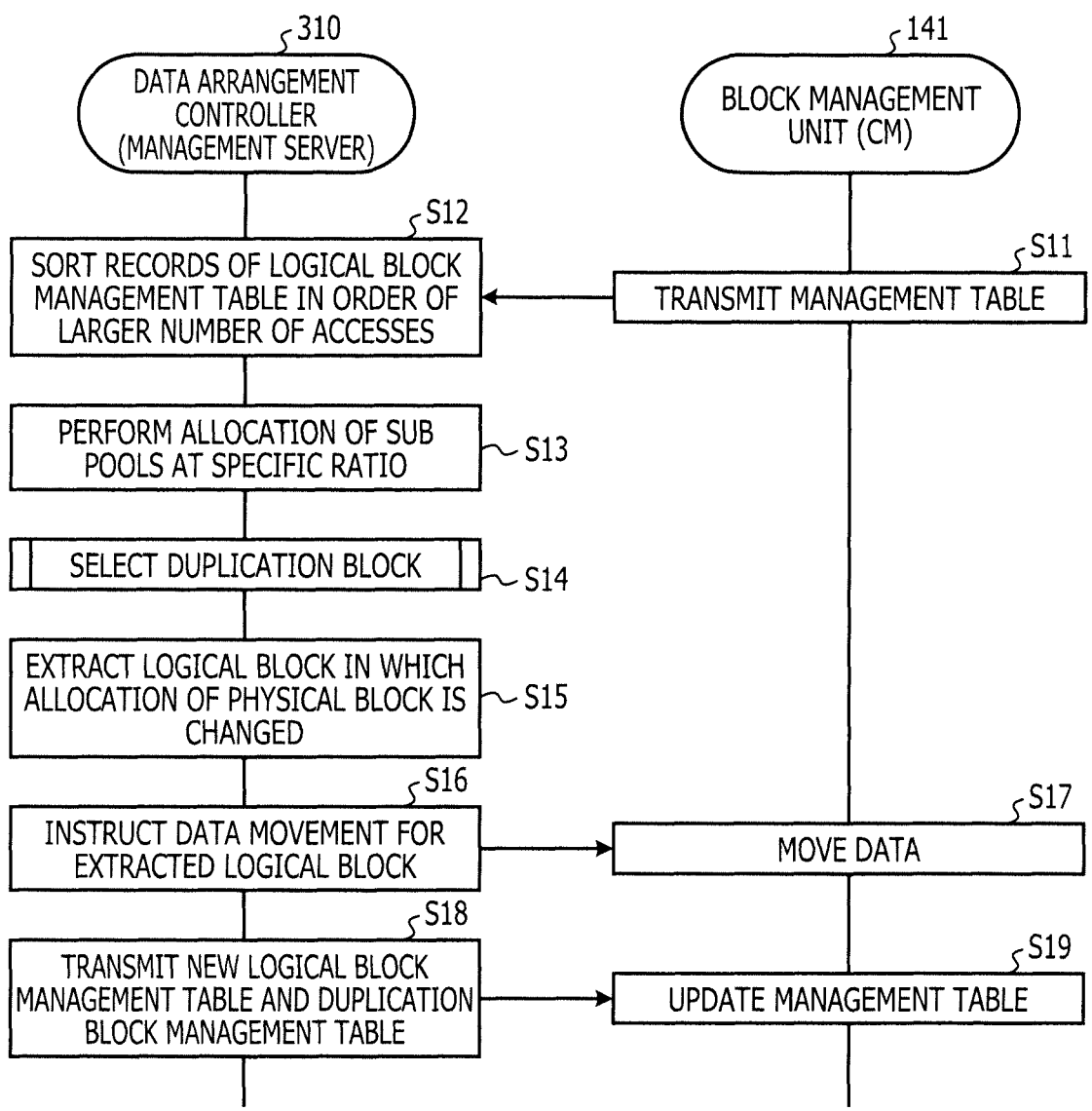
FIG. 16 is a sequence diagram illustrating an example of a processing procedure of a block management unit and a data arrangement controller.

FIG. 16 is a sequence diagram illustrating examples of processing procedures of the block management unit and the data arrangement controller FIG. 16. The processing of FIG. 16 is repeatedly executed at specific intervals (for example, 0.5 secs).

[Step S11] The block management unit 141 of the CM 110 transmits the contents of the logical block management table 131, the duplication block management table 132, and the access status management table 133 to the management server 300. In addition, after the block management unit 141 has transmitted the contents to the management server 300, the block management unit 141 resets values of the number of times of data reading and the number of times of data writing in the access status management table 133 at "0".

The processing in Step S12 or the subsequent step is executed for each logical volume. In addition, for example, when a plurality of storage pools exists, and one or more logical volumes are allocated to a single storage pool, the processing in Step S12 or the subsequent step may be executed for each of the storage pools.

[Step S12] The data arrangement controller 310 of the management server 300 receives the contents of the logical block management table 131, the duplication block management table 132, and the access status management table 133 from the block management unit 141 of the CM 110. The data arrangement controller 310 creates a new logical block management table by sorting records of the logical block management table 131 in order of the larger number of accesses registered in the access status management table 133 for the corresponding logical block. In the created new logical block management table, the item of the physical location is empty.

[Step S13] The data arrangement controller 310 allocates the first sub pool 152a, the second sub pool 152b, and the third sub pool 152c to logical blocks in the new logical block management table, from the leading side of the logical blocks at a specific ratio. For example, the data arrangement controller 310 allocates the first sub pool 152a to logical blocks corresponding to a 15% portion from the leading of the logical blocks, allocates the second sub pool 152b to logical blocks corresponding to the following 35% portion, and allocates the third sub pool 152c to the remaining logical blocks.

In addition, the data arrangement controller 310 allocates a physical block to each of the logical blocks by executing the following processing for the logical block.

The data arrangement controller 310 refers to a record related to a corresponding logical block in the logical block management table 131 and the duplication block management table 132 that have been received in Step S12. The data arrangement controller 310 determines whether the sub pool currently allocated to the corresponding logical block is the same as the sub pool allocated in Step S13. When the corresponding logical block corresponds to a duplication block, identification information of a sub pool on the upper-level layer side from among the allocated two sub pools is used for the determination.

When the sub pools are the same, the data arrangement controller 310 copies information on the physical location registered in the referred record to the item of the physical location in the new logical block management table. In addition, when the sub pools are different, the data arrangement controller 310 allocates an empty physical block of the sub pool allocated in Step S13 to the corresponding logical block, and registers information indicating the logical block to which the empty physical block has been allocated, in the item of the physical location in the new logical block management table.

Figure 17:
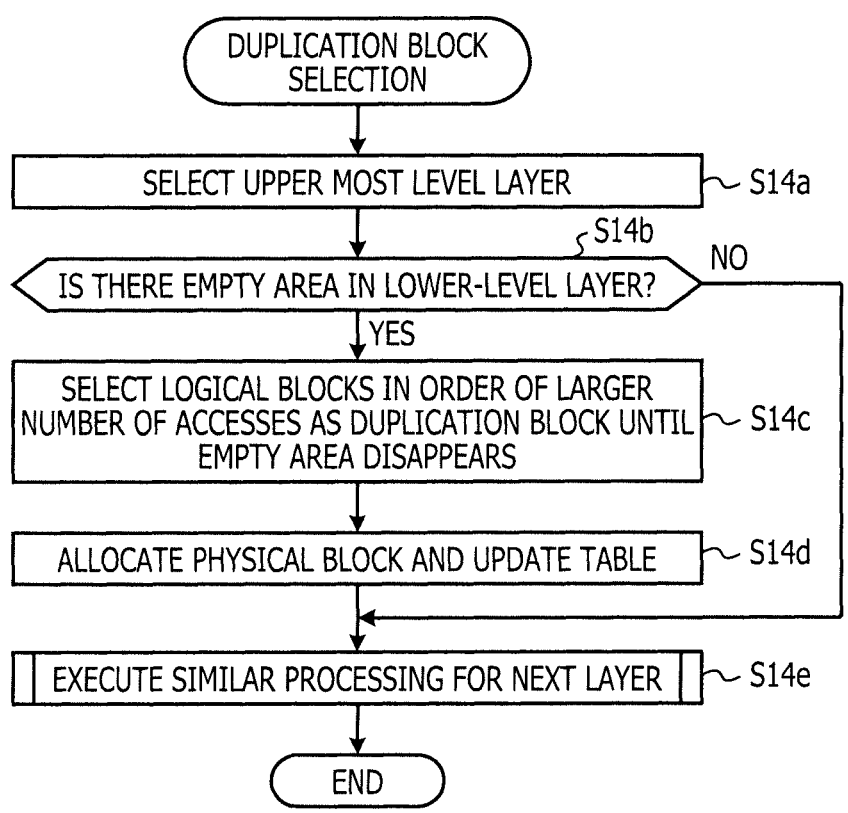
FIG. 17 is a flowchart illustrating an example of a selection processing procedure of a duplication block.

[Step S14] The data arrangement controller 310 selects a duplication block, from among the logical blocks. Here, FIG. 17 is a flowchart illustrating an example of a selection processing procedure of a duplication block.

[Step S14a] The data arrangement controller 310 selects the upper-most level layer sub pool, that is, the first sub pool 152a as a processing target.

[Step S14b] The data arrangement controller 310 determines whether there is an empty area in the lower-level layer, that is, the second sub pool 152b. The data arrangement controller 310 executes processing of Step S14c when there is an empty area in the second sub pool 152b, and executes processing of Step S14e when there is no empty area in the second sub pool 152b.

[Step S14c] The data arrangement controller 310 executes the following processing until an empty area of the second sub pool 152b disappears using the logical block to which the first sub pool 152a has been allocated in Step S13 of FIG. 16 as a target. The data arrangement controller 310 selects logical blocks in order of the larger number of accesses as a duplication block.

[Step S14d] The data arrangement controller 310 creates a new duplication block management table, and executes the following processing for each of the logical blocks selected as the duplication blocks in Step S14c.

The data arrangement controller 310 adds a record of the corresponding logical block to the new duplication block management table. The data arrangement controller 310 registers information on the physical location registered in the record of the corresponding logical block, from among the records in the new logical block management table created in Step S12 of FIG. 16, in the item of the physical location in the record added to the new duplication block management table. In addition, the data arrangement controller 310 updates the item of the physical location to "LB" in the record of the corresponding logical block of the new logical block management table.

As a result, while the creation of the new logical block management table is completed, information indicating the physical block of the sub pool on the upper-level layer side is registered in the item of the physical location in the new duplication block management table.

Next, the data arrangement controller 310 further executes the following processing for each of the logical blocks selected as duplication blocks.

The data arrangement controller 310 refers to the record of the corresponding logical block in the logical block management table 131 and the duplication block management table 132 that have been received in Step S12 of FIG. 16. The data arrangement controller 310 determines whether the corresponding logical block is set as a duplication block for which duplication is performed between the first sub pool 152a and the second sub pool 152b, based on the content of the referred record.

When the corresponding logical block is set as a duplication block, the data arrangement controller 310 additionally registers information on the physical location registered in the corresponding record of the received duplication block management table 132, in the item of the physical location in the corresponding record of the new duplication block management table. In addition, when the corresponding logical block is not set as a duplication block, the data arrangement controller 310 allocates an empty physical block of the second sub pool 152b to the corresponding logical block. In addition, the data arrangement controller 310 additionally registers an identification number of the allocated empty physical block in the item of the physical location in the corresponding record of the new duplication block management table.

[Step S14e] The data arrangement controller 310 executes the processing of Steps S14a to S14d using the sub pool of the next layer, that is, the second sub pool 152b as a processing target. Here, a description of these processing content is omitted, but due to such processing, a logical block the duplication of which is performed between the second sub pool 152b and the third sub pool 152c is determined. In the processing corresponding to Step S14d, when a new duplication block management table has been already created, such a duplication block management table is used.

At the time point at which the above-described processing of FIG. 17 has ended, creation of a new logical block management table obtained by updating a correspondence relationship between logical blocks and physical blocks is completed. In addition, when a duplication block has been selected in the processing of FIG. 17, creation of a new duplication block management table is also completed.

Returning to FIG. 16, the description is made below again.

[Step S15] The data arrangement controller 310 respectively compares the logical block management table 131 and the duplication block management table 132 that have been received in Step S12 of FIG. 16, with the newly-created logical block management table and duplication block management table. When a duplication block has not been selected in FIG. 17, the data arrangement controller 310 creates a new duplication block management table in which logical blocks are not registered and uses the new duplication block management table for the comparison.

The data arrangement controller 310 extracts a logical block in which the allocated physical block is changed.

[Step S16] The data arrangement controller 310 transmits, to the CM 110, instruction information used to instruct to move data between physical blocks for the logical block extracted in Step S15.

[Step S17] The block management unit 141 of the CM 110 moves the data between the physical blocks, based on the received instruction information.

[Step S18] The data arrangement controller 310 of the management server 300 transmits the created new logical block management table and duplication block management table to the CM 110.

[Step S19] The block management unit 141 of the CM 110 respectively updates the new logical block management table 131 and duplication block management table 132 in the storage unit 130 by the received new logical block management table and duplication block management table.

Processing of the performance management unit 142 of the CM 110 is described below. Here, first, a creation method of a device performance management table 134 referred to by the performance management unit 142 is described.

FIG. 18 is a diagram illustrating an example of a creation method of a device performance management table. As described above, the information in the device performance management table 134 is used as a reference value for determining whether the current processing amount in each of the sub pools reaches the limit value. The device performance management table 134 may be stored in the storage unit 130 in a state in which values of the device performance management table 134 have been set in advance, but for example, setting values may be calculated in the following method. Here, as an example, it is assumed that setting values are calculated by the performance management unit 142.

A device specification table 137 illustrated in FIG. 18 holds a specification of the maximum performance for each of memories that constitute a sub pool. The information in the device specification table 137 may be, for example, information disclosed by a maker of the memory in advance, or may be information obtained by measurement.

The device performance management table 134 holds the maximum performance at the time of sequential access and the maximum performance at the time of random access for each of the SSD, the online disk, and the nearline disk. As the maximum performance at the time of the sequential access, a read throughput, a write throughput, a read response period, and a write response period are registered. As the maximum performance at the time of the random access, a read input/output per second (IOPS), a write IOPS, a read response period, and a write response period are registered.

In the following description, it is assumed that the device specification table 137 is stored in the storage unit 130, and is referred to by the performance management unit 142. The performance management unit 142 may calculate information in the device performance management table 134 in accordance with the following formulas (1-1) to (1-4), based on the device specification table 137.

The maximum number of read blocks=the number of read blocks per millisecond×read response period at the time of the sequential access (1-1)

The maximum number of write blocks=the number of write blocks per millisecond×write response time at the time of the sequential access (1-2)

The maximum number of read commands=the number of read commands per millisecond×read response time at the time of the random access (1-3)

The maximum number of write commands=the number of write commands per millisecond×write response time at the time of the random access (1-4)

Here, the number of read blocks per millisecond is a value obtained by converting the read throughput at the time of the sequential access into the number of blocks allowed to be read per millisecond. In addition, the number of write blocks per millisecond is a value obtained by converting the write throughput at the time of the sequential access into the number of blocks allowed to be written per millisecond.

In addition, the number of read commands per millisecond is a value obtained by converting the read IOPS into the number of read commands allowed to be executed per millisecond. In addition, the number of write commands per millisecond is a value obtained by converting the write IOPS into the number of write commands allowed to be executed per millisecond.

In the device performance management table 134 illustrated in FIG. 18, the calculation is performed so that it is assumed that the size of one block is 500 bytes, and one kilobyte is 1000 bytes.

In the above-described method, in the device performance management table 134, a limit value of a processing amount for each of the memories (maximum processing performance) is registered.

Evaluation processing of a processing amount for each of the sub pools by the performance management unit 142 is described below.

Figure 19:
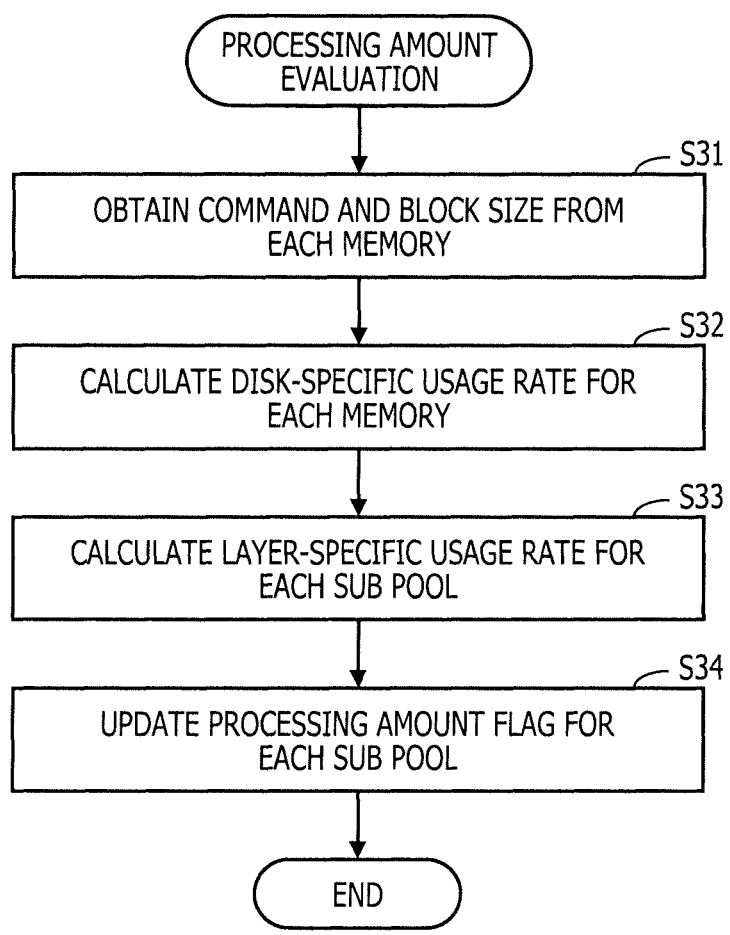
FIG. 19 is a flowchart illustrating an example of an evaluation processing procedure of a processing amount.

FIG. 19 is a flowchart illustrating an example of an evaluation processing procedure of a processing amount. The processing of FIG. 19 is repeatedly executed at specific time intervals.

[Step S31] The performance management unit 142 obtains all commands being executed and the block sizes added to the commands from the command management table 125 of each of the memories in the DE 120.

[Step S32] First, the performance management unit 142 calculates indexes indicating the current read throughput and the current write throughput for each of the memories, based on the information obtained in Step S31. For example, as the index of the read throughput, the number of read commands being executed and the number of blocks in each of which data reading is being executed (total value of the block sizes corresponding to the read commands being executed) are calculated. In addition, as the index of the write throughput, the number of write commands being executed and the number of blocks in each of which data writing is being executed (total value of the block sizes corresponding to the write commands being executed) are calculated.

In addition, the performance management unit 142 calculates a ratio of the current processing amount for the limit value of the processing amount, for each of the memories, based on the calculated value. Hereinafter, such a ratio is referred to as "usage rate". The usage rate is a rate indicating a degree of the performance currently being demonstrated to the maximum performance. In the embodiment, as the usage rates, a usage rate Rrb of the number of read blocks, a usage rate Rwb of the number of write blocks, a usage rate Rrc of the number of read commands, and a usage rate Rwc of the number of write commands are calculated. The performance management unit 142 respectively calculates these values in accordance with the following formulas (2-1) to (2-4).

The usage rate $Rrb$ of the number of read blocks=the number of blocks in each of which data reading is being executed/the maximum number of read blocks (2-1)

The usage rate $Rwb$ of the number of write blocks=the number of blocks in each of which data writing is being executed/the maximum number of write blocks (2-2)

The usage rate $Rrc$ of the number of read commands=the number of read commands being executed/the maximum number of read commands (2-3)

The usage rate $Rwc$ of the number of write commands=the number of write commands being executed/the maximum number of write commands (2-4)

The maximum number of read blocks, the maximum number of write blocks, the maximum number of read commands, and the maximum number of write commands are values registered for the type of the corresponding memory in the device performance management table 134.

Each of the above-described usage rates is a value that has been calculated so that the patterns of the sequential access and the random access are not distinguished from each other. Therefore, the performance management unit 142 analyzes the pattern of an access currently being executed in the memory based on the information obtained from the memory, and calculates "disk-specific usage rate" indicating an overall usage rate for which reflection of the analysis result has been performed, for each of the memories. The performance management unit 142 calculates the disk-specific usage rate in accordance with the following formula (3).

Disk-specific usage rate=$Rrb$×sequential read rate+ $Rwb$×sequential write rate+$Rrc$×random read rate+$Rwc$×random write rate (3)

Here, for example, the performance management unit 142 estimates a command in which the number of data blocks is 128 blocks or more as sequential access command, from among the commands obtained from the memory. In addition, the performance management unit 142 estimates a command in which the number of data blocks is less than 128 blocks as random access command. The performance management unit 142 respectively calculates a sequential read rate, a sequential write rate, a random read rate, and a random write rate in the formula (3), in accordance with the following formulas (4-1) to (4-4), using such estimation results.

The sequential read rate=the number of blocks in each of which sequential reading is being executed/(the number of blocks in each of which data reading is being executed+the number of blocks in each of which data writing is being executed) (4-1)

The sequential write rate=the number of blocks in each of which sequential writing is being executed/(the number of blocks in each of which data reading is being executed+the number of blocks in each of which data writing is being executed) (4-2)

The random read rate=the number of random read commands being executed/(the number of read commands being executed+the number of write commands being executed) (4-3)

The random write rate=the number of random write commands being executed/(the number of read commands being executed+the number of write commands being executed) (4-4)

[Step S33] The performance management unit 142 calculates "layer-specific usage rate" indicating a usage rate of for each of the sub pools, using the disk-specific usage rate calculated in Step S32. The layer-specific usage rate is calculated as an average value of the disk-specific usage rates of the memories that constitute the sub pool.

The calculated layer-specific usage rate is a rate indicating a degree of the performance being currently demonstrated to the maximum performance in the corresponding sub pool. The maximum value of the layer-specific usage rate is 100%. When the layer-specific usage rate is 100%, it is indicated that the IO processing amount in the sub pool reaches the limit value.

[Step S34] The performance management unit 142 updates a value of the processing amount flag of the corresponding sub pool in the flag management table 135 depending on whether the calculated layer-specific usage rate reaches a specific threshold value. As an example of the embodiment, it is assumed that the threshold value is 100%. The performance management unit 142 sets the processing amount flag at "1" when the layer-specific usage rate reaches 100%, and sets the processing amount flag at "0" when the layer-specific usage rate does not reach 100%.

The threshold value may be set at a value lower than 100% (however, the value is larger than 0%) in consideration of a calculation error of the current processing amount.

In the above-described processing of FIG. 19, the processing amount flag is set based on an estimation value of a ratio of processing by the sequential access and processing by the random access, from among the pieces of IO processing being executed in the sub pool. As a result, the current IO processing amount in the sub pool may be estimated accurately, and a probability may be increased in which the response performance for an access request is improved.

As indexes indicating the current processing amount and the limit value of the processing amount or an index indicating the ratio of the processing amount to the limit value, values other than the above-described examples may be used. For example, instead of the above-described disk-specific usage rate, a disk busy rate indicating a ratio of a time in which access processing of the memory has been executed within a unit of time may be used as an index.

In this case, the performance management unit 142 obtains a disk busy rate for each of the memories and calculates a busy rate for each of the sub pools (ratio of a time in which the access processing has been executed), based on the obtained value. The busy rate for each of the sub pools is calculated, for example, as an average value of the disk busy rates of the memories that constitute the sub pool. For example, the performance management unit 142 sets the corresponding processing amount flag at "1" when the busy rate for each of the sub pools reaches 100%, and sets the processing amount flag at "0" when the busy rate for each of the sub pools does not reach 100%.

Pieces of processing of the volume access controller 143 and the disk access controller 144 of the CM 110 are described below.

The volume access controller 143 receives an access request for the logical volume 151 from the operation server 200, and executes access processing corresponding to the request. In the processing, the volume access controller 143 converts a logical address to which the access has been requested into a physical address on the sub pool, and requests access processing so as to notify the disk access controller 144 of the physical address. In addition, when data reading from the duplication block has been requested, the volume access controller 143 determines whether the data is to be read from the upper-level layer sub pool or the lower-level layer sub pool, based on the corresponding processing amount flag.

For example, the disk access controller 144 manages the memories that constitute each of the sub pools by RAID. The disk access controller 144 converts a physical address specified by the volume access controller 143 into a physical address for each of the memories, and accesses the memory.

Here, access processing to a duplication block by the volume access controller 143 is described with reference to FIGS. 20 and 21.

Figure 20:
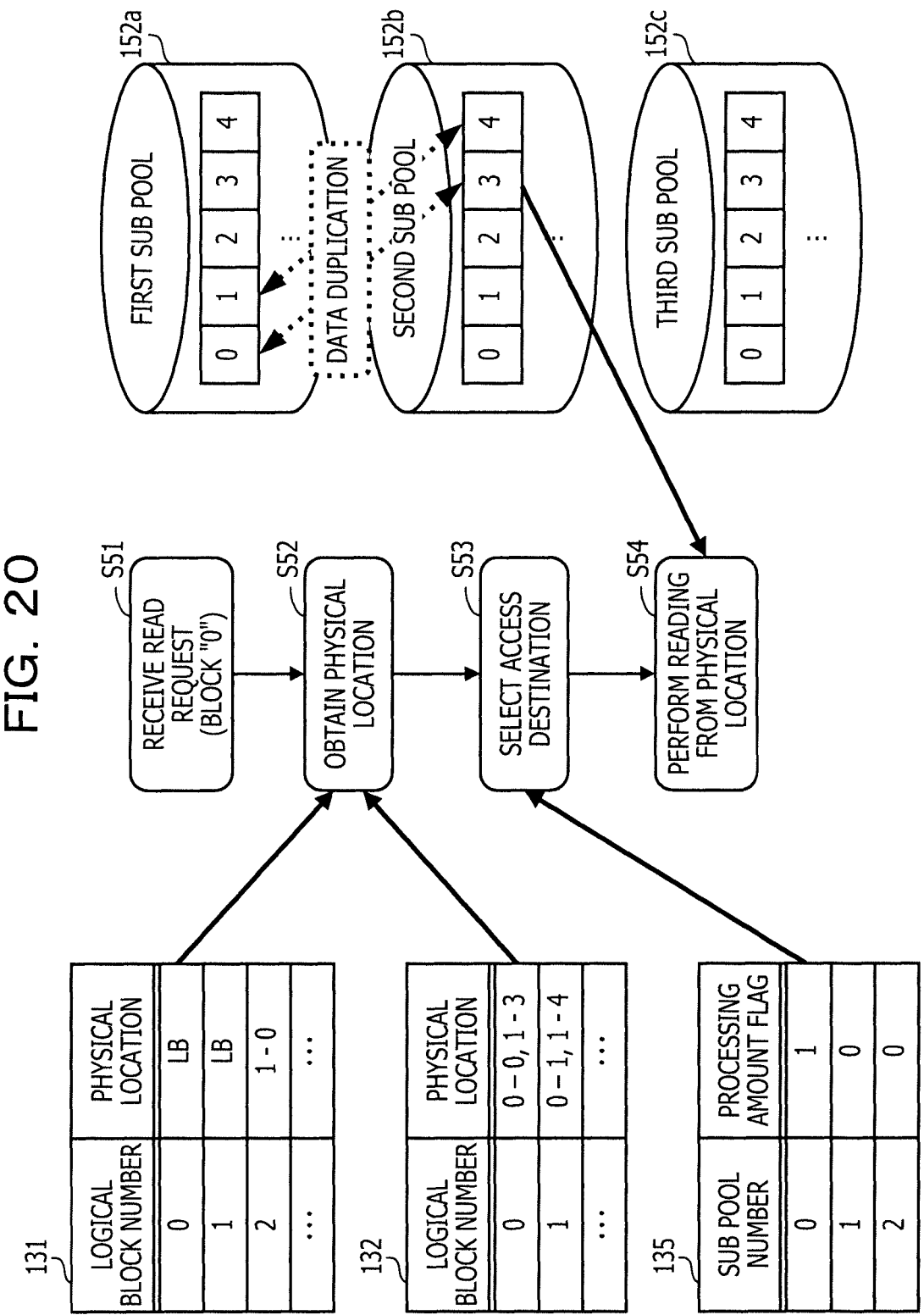
FIG. 20 is a diagram illustrating data reading processing from a duplication block.

First, FIG. 20 is a diagram illustrating data reading processing from the duplication block. The volume access controller 143 receives a read request from a logical block of the logical volume 151, from the operation server 200. In the example of FIG. 20, it is assumed that data reading from logical block "0" has been requested (Step S51).

First, the volume access controller 143 obtains a physical location associated with the specified logical block "0", with reference to the logical block management table 131. In the example of FIG. 20, "LB" is registered in the item of the physical location, and the volume access controller 143 determines that the specified logical block "0" is a duplication block. In this case, the volume access controller 143 obtains the physical location associated with the logical block "0" with reference to the duplication block management table 132 (Step S52). In the example of FIG. 20, the physical block "0" of the sub pool "0" (first sub pool 152*a*) and a physical block "3" of a sub pool "1" (second sub pool 152*b*) are allocated to the logical block "0".

When the read destination is a duplication block, the volume access controller 143 selects a sub pool to be accessed (Step S53). The volume access controller 143 reads a processing amount flag corresponding to the allocated sub pool "0" on the upper-level layer side, with reference to the flag management table 135. In the example of FIG. 20, the processing amount flag is "1", and the current processing amount in the sub pool "0" reaches the limit value. In this case, the volume access controller 143 selects the sub pool "1" on the lower-level layer side as the access destination, reads data from the physical block "3" of the sub pool "1", and transmits the read data to the operation server 200 (Step S54).

As described above, when it is estimated that the current processing amount in the sub pool "0" on the upper-level layer side reaches the limit value, data is read from the sub pool "1" on the lower-level layer side. As a result, accesses are distributed between the sub pools, and a probability is reduced in which the response performance in the sub pool "0" on the upper-level layer side is reduced due to an excessive access load. As a result, the response performance for read requests may be improved in the whole storage device 100.

Although not illustrated, when the processing amount flag is "0", and there is a spare room in the current processing amount in the sub pool "0", the volume access controller 143 reads data from the physical block "0" of the sub pool "0" and transmits the read data to the operation server 200.

Figure 21:
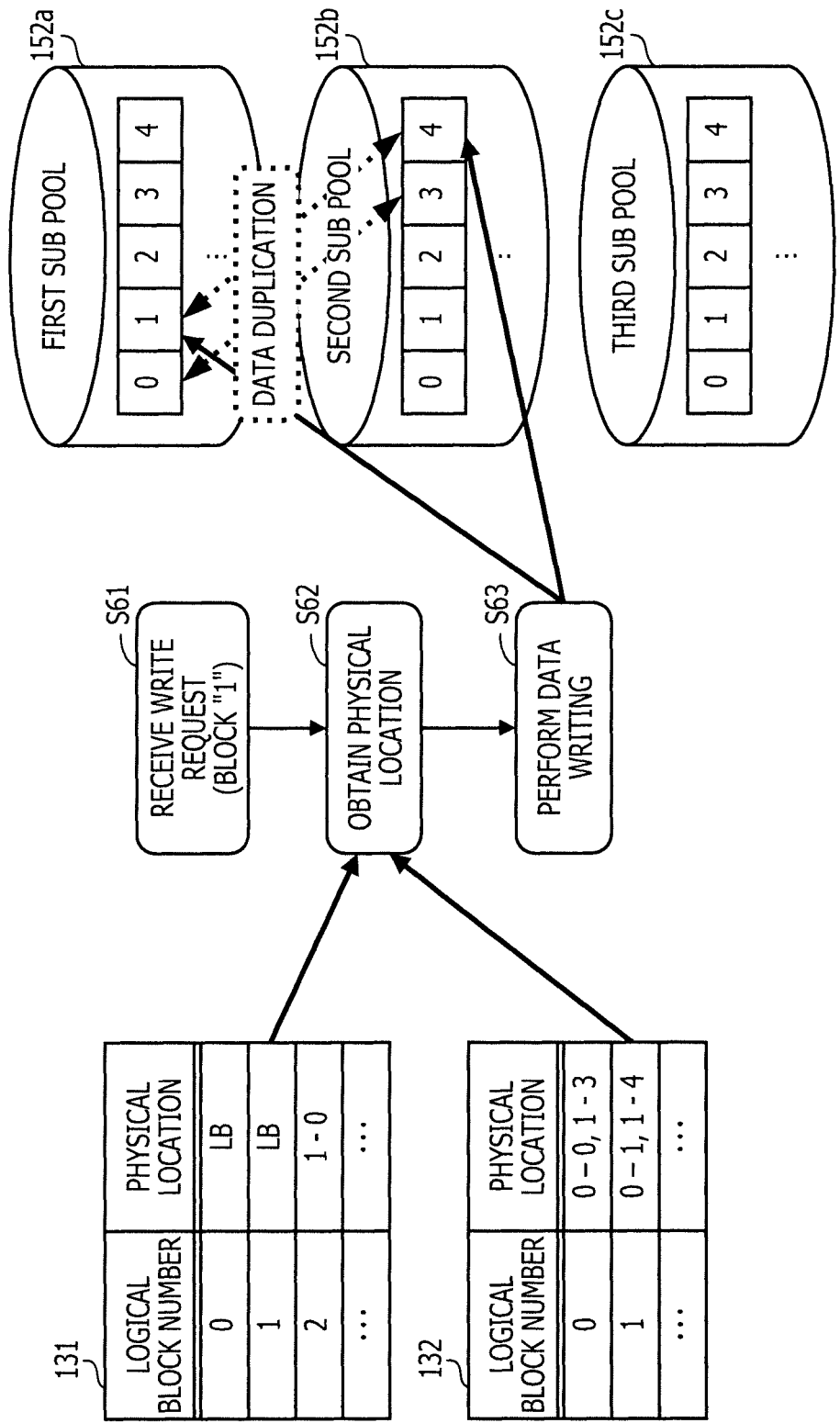
FIG. 21 is a diagram illustrating data update processing for the duplication block.

FIG. 21 is a diagram illustrating data update processing for a duplication block. The volume access controller 143 receives a write request of data to a logical block of the logical volume 151, from the operation server 200. In the example of FIG. 21, it is assumed that data writing to the logical block "1" has been requested (Step S61). Here, data has been already written to the logical block "1", and update of the data of the logical block "1" is requested in the example of FIG. 21.

The volume access controller 143 obtains a physical location associated with the specified logical block "1", with reference to the logical block management table 131. In the example of FIG. 21, "LB" is registered in the item of the physical location, and the volume access controller 143 determines that the specified logical block "1" is a duplication block. In this case, the volume access controller 143 obtains the physical location associated with the logical block "1", with reference to the duplication block management table 132 (Step S62). In the example of FIG. 21, a physical block "1" of the sub pool "0" (first sub pool 152*a*) and a physical block "4" of the sub pool "1" (second sub pool 152*b*) are allocated to the logical block "1".

When the read destination is a duplication block, the volume access controller 143 writes data to both of the allocated physical blocks of the sub pools. In the example of FIG. 21, the volume access controller 143 writes the data to both of the physical block "1" of the sub pool "0" and the physical block "4" of the sub pool "1" (Step S63).

As illustrated in the above-described example of FIG. 21, when data update for the duplication block has been requested, both of the pieces of data of the allocated two physical block are updated. As a result, the duplication state of the data may be held even after the data has been updated, and the access variance effect may be obtained similar to the case before the pieces of data are updated.

Figure 22:
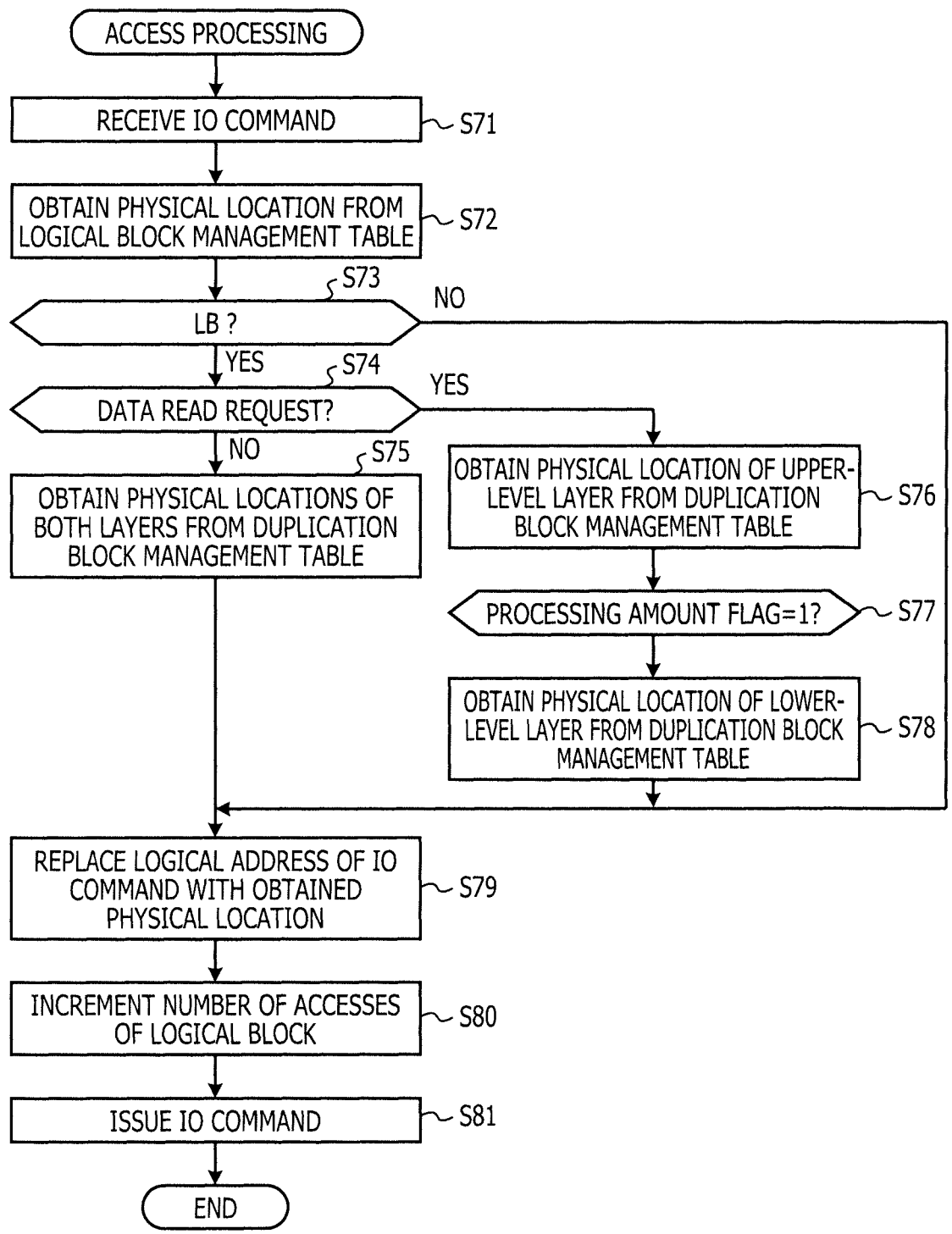
FIG. 22 is a flowchart illustrating an example of an access processing procedure that corresponds to a request from an operation server.

FIG. 22 is a flowchart illustrating an example of an access processing procedure that corresponds to a request from the operation server.

[Step S71] The volume access controller 143 receives an IO command from the operation server 200. When the IO command is a write command, the volume access controller 143 also receives write data.

[Step S72] The volume access controller 143 obtains information on a physical location associated with a logical block specified by the IO command, from the logical block management table 131.

[Step S73] The volume access controller 143 executes processing of Step S74 when the obtained information is "LB", and executes processing of Step S79 when the obtained information is not "LB".

[Step S74] The volume access controller 143 executes processing of Step S76 when the IO command is a read command, and executes processing of Step S75 when the IO command is a write command.

[Step S75] The volume access controller 143 obtains pieces of information on physical locations associated with the logical block specified by the IO command, from the duplication block management table 132. Here, information on the physical location in the upper-level layer sub pool and information on the physical location in the lower-level layer sub pool are obtained.

[Step S76] The volume access controller 143 obtains the information on the physical location in the upper-level layer sub pool from among the pieces of information on the two physical locations associated with the logical bloc specified by the IO command, from the duplication block management table 132.

[Step S77] The volume access controller 143 reads a processing amount flag corresponding to the sub pool indicated by the physical location obtained in Step S76, from the flag management table 135. The volume access controller 143 executes processing of Step S78 when the processing amount flag is "1", and executes processing of Step S79 when the processing amount flag is "0".

[Step S78] The volume access controller 143 obtains the information on the physical location in the lower-level layer sub pool from among the pieces of information of the two physical locations associated with the logical block specified by the IO command, from the duplication block management table 132.

[Step S79] The volume access controller 143 replaces the logical address specified by the IO command with the obtained physical location. The physical location corresponds to the two physical locations obtained in Step S75 when "No" is determined in Step S74. In addition, the physical location corresponds to the physical location obtained in Step S78 when "Yes" is determined in Step S77. In addition, the physical location corresponds to the physical location obtained in Step S76 when "No" is determined Step S77.

When the IO command is a write command, and a physical block is not allocated to a logical block that is the write destination of the command, for example, the volume access controller 143 newly allocates an empty block of the first sub pool 152*a* to the logical block. In this case, in Step S79, the logical address is replaced with the physical location indicating the newly-allocated empty block.

[Step S80] The volume access controller 143 increments the number of accesses of a record corresponding to the logical block specified by the IO command, from among the records of the access status management table 133.

[Step S81] The volume access controller 143 issues an IO command in which the logical address has been replaced with the physical location in Step S79 to the disk access controller 144, and requests IO processing for the disk access controller 144. The disk access controller 144 executes the IO processing for the memory in the DE 120, based on the issued IO command, and notifies the volume access controller 143 of completion of the execution after the execution has been completed. When the volume access controller 143 receives the execution completion notification, the volume access controller 143 sends the execution completion to the operation server 200.

The processing functions of the devices described in the above-described embodiments (for example, the storage controller 10, the CM 110, the operation server 200, and the management server 300) may be realized by a computer. In such a case, a program in which a processing content of the function to be included in each of the devices is described is provided, and the above-described processing function is realized on the computer when the program is executed by the computer. The program in which the processing content is described may be recorded in a computer-readable recording medium. Examples of the computer-readable recording medium include a magnetic memory, an optical disk, a MO recording medium, and a semiconductor memory. Examples of the magnetic memory include a HDD, a flexible disk (FD), and a magnetic tape. Examples of the optical disk include a digital versatile disc (DVD), a DVD-RAM, a compact disc-read only memory (CD-ROM), and a CD-recordable (R)/rewritable (RW). An example of the MO recording medium includes a MO disk.

When distribution of the program is performed, for example, a portable recording medium such as a DVD or a CD-ROM in which the program is recorded is sold. In addition, the program may be stored in a memory of a server computer, and the program may be transferred from the server computer to another computer through a network.

The computer that executes a program stores, for example, the program recorded in the portable recording medium or the program transferred from the server computer, in the memory. In addition, the computer reads the program from the memory and executes processing corresponding to the program. The computer may read the program from the portable recording medium directly, and may execute processing corresponding to the program. In addition, the computer may execute processing corresponding to a received program sequentially each time the program is transferred from the server computer coupled through the network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device comprising:
   a first memory having a first access speed, configured to store a plurality of data blocks;
   a second memory having a second access speed slower than the first access speed; and
   a processor coupled to the first memory and the second memory and configured to:
      copy one or a plurality of first data blocks included in the plurality of data blocks stored in the first memory, to the second memory,
      determine a data block having a high read frequency among the plurality of data blocks;
      preferentially copy the determined data block having a high read frequency among the plurality of data blocks, to the second memory;
      determine whether a processing amount per unit of time in the first memory reaches a threshold value indicating a limit value of the processing amount based on a first comparison result and a second comparison result, the first comparison result being obtained by comparing a data amount for sequential access during input/output processing in the first memory with a first limit value related to the data amount, the second comparison result being obtained by comparing a number of commands each of which is used for random access being executed in the first memory with a second limit value related to the number of commands, the limit value being determined based on the first access speed, when the processor receives a read request of a second data block included in the first data blocks, and
      read the second data block from the first memory when it is determined that the processing amount does not reach the threshold value, and
      read the second data block from the second memory when it is determined that the processing amount reaches the threshold value.

2. The storage device according to claim 1, wherein the plurality of data blocks are data blocks each having a high access frequency among a plurality of third data blocks included in a logical memory area, and the processor stores data blocks each having a low access frequency among the plurality of third data blocks, in the second memory.

3. The storage device according to claim 1, wherein the processor updates a fourth data block included in the first data blocks and stored in the first memory and the second memory, to a new data block when the processor receives an update request of the fourth data block.

4. A storage system comprising:
   a first memory having a first access speed, configured to store a plurality of data blocks;
   a second memory having a second access speed slower than the first access speed;
   a first processor coupled to the first memory and the second memory and configured to:
      store one or a plurality of first data blocks to the first memory,
      store one or a plurality of second data blocks to the second memory, and
      copy one or a plurality of third data blocks included in the first data blocks in the first memory, to the second memory;
      determine a data block having a high read frequency among the plurality of data blocks;
      preferentially copy the determined data block having a high read frequency among the plurality of data blocks, to the second memory; and
   a second processor coupled to the first memory and the second memory and configured to:
      determine whether a processing amount per unit of time in the first memory reaches a threshold value indicating a limit value of the processing amount based on a first comparison result and a second comparison result, the first comparison result being obtained by comparing a data amount for sequential access during input/output processing in the first memory with a first limit value related to the data amount, the second comparison result being obtained by comparing a number of commands each of which is used for random access being executed in the first memory with a second limit value related to the number of commands, the limit value being determined based on the first access speed, when the processor receives a read request of a fourth data block included in the third data blocks, and read the fourth data block from the first memory when it is determined that the processing amount does not reach the threshold value, and read the fourth data block from the second memory when it is determined that the processing amount reaches the threshold value.

5. A storage controlling method comprising:

copying, by a processor, one or a plurality of first data blocks included in a plurality of data blocks stored in a first memory, to a second memory, the first memory having a first access speed, the second memory having a second access speed slower than the first access speed;

determining a data block having a high read frequency among the plurality of data blocks;

preferentially copying the determined data block having a high read frequency among the plurality of data blocks, to the second memory;

determining, by a processor, whether a processing amount per unit of time in the first memory reaches a threshold value indicating a limit value of the processing amount based on a first comparison result and a second comparison result, the first comparison result being obtained by comparing a data amount for sequential access during input/output processing in the first memory with a first limit value related to the data amount, the second comparison result being obtained by comparing a number of commands each of which is used for random access being executed in the first memory with a second limit value related to the number of commands, the limit value being determined based on the first access speed, when the processor receives a read request of a second data block included in the first data blocks;

reading, by a processor, the second data block from the first memory when it is determined that the processing amount does not reach the threshold value; and reading the second data block from the second memory when it is determined that the processing amount reaches the threshold value.

\* \* \* \* \*